(12) United States Patent
Steiner et al.

(10) Patent No.: US 8,810,154 B2
(45) Date of Patent: *Aug. 19, 2014

(54) MULTIPLE LOCATION LOAD CONTROL SYSTEM

(75) Inventors: James P. Steiner, Royersford, PA (US); Cyril Baby, Conshohocken, PA (US); Christopher Buck, Bethlehem, PA (US); Daniel F. Carmen, Schnecksville, PA (US)

(73) Assignee: Lutron Electronics Co., Inc., Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/540,662

(22) Filed: Jul. 3, 2012

(65) Prior Publication Data
US 2013/0169186 A1 Jul. 4, 2013

Related U.S. Application Data

(63) Continuation of application No. 12/959,939, filed on Dec. 3, 2010, now Pat. No. 8,242,708, which is a continuation of application No. 12/106,614, filed on Apr. 21, 2008, now Pat. No. 7,872,429.

(60) Provisional application No. 60/925,782, filed on Apr. 23, 2007, provisional application No. 61/016,027, filed on Dec. 21, 2007.

(51) Int. Cl.
*H05B 37/00* (2006.01)
(52) U.S. Cl.
USPC .............................. 315/295; 315/308; 315/362

(58) Field of Classification Search
USPC ......... 315/299, 302, 301, 307, 308, 291, 224, 315/360, 362, 294, 295, 297
See application file for complete search history.

(56) References Cited

U.S. PATENT DOCUMENTS

| | | | |
|---|---|---|---|
| 6,346,781 B1* | 2/2002 | Mosebrook et al. | 315/294 |
| 7,872,429 B2* | 1/2011 | Steiner et al. | 315/295 |
| 8,242,708 B2* | 8/2012 | Steiner et al. | 315/295 |
| 2007/0216318 A1* | 9/2007 | Altonen et al. | 315/209 R |

* cited by examiner

*Primary Examiner* — David H Vu
(74) *Attorney, Agent, or Firm* — Mark E. Rose; Philip N. Smith; Bridget L. McDonough

(57) ABSTRACT

A multiple location load control system comprises a main device and remote devices, which do not require neutral connections, but allow for visual and audible feedback at the main device and the remote devices. The main device and the remote devices are adapted to be coupled in series electrical connection between an AC power source and an electrical load, and to be further coupled together via an accessory wiring. The remote devices can be wired on the line side and the load side of the load control system, such that the main device is wired "in the middle" of the load control system. The main device is operable to enable a charging path to allow the remote devices to charge power supplies through the accessory wiring during a first time period of a half-cycle of the AC power source. The main device and the remote devices are operable to communicate with each other via the accessory wiring during a second time period of the half-cycle.

20 Claims, 30 Drawing Sheets

MULTIPLE LOCATION LOAD CONTROL SYSTEM

RELATED APPLICATIONS

This application is a continuation application of commonly-assigned U.S. patent application Ser. No. 12/959,939, filed Dec. 3, 2010, now U.S. Pat. No. 8,242,708, issued Aug. 14, 2012, which is a continuation application of commonly-assigned U.S. patent application Ser. No. 12/106,614, filed Apr. 21, 2008, now U.S. Pat. No. 7,872,429, issued Jan. 18, 2011, which is a non-provisional application of commonly-assigned U.S. Provisional Application Ser. No. 60/925,782, filed Apr. 23, 2007, and U.S. Provisional Application Ser. No. 61/016,027, filed Dec. 21, 2007, all entitled MULTIPLE LOCATION LOAD CONTROL SYSTEM, the entire disclosures of which are hereby incorporated by reference.

BACKGROUND OF THE INVENTION

1. Field of the Invention

The present invention relates to multiple location load control systems having multiple smart load control devices, and more particularly, a multiple location dimming system that includes a smart dimmer and one or more remote dimmers for controlling the amount of power delivered to a lighting load, where all of the smart dimmers and the remote dimmers are operable to display a present intensity level of the lighting load on a visual indicator.

2. Description of the Related Art

Three-way and four-way switch systems for use in controlling electrical loads, such as lighting loads, are known in the art. Typically, the switches are coupled together in series electrical connection between an alternating-current (AC) power source and the lighting load. The switches are subjected to an AC source voltage and carry full load current between the AC power source and the lighting load, as opposed to low-voltage switch systems that operate at low voltage and low current, and communicate digital commands (usually low-voltage logic levels) to a remote controller that controls the level of AC power delivered to the load in response to the commands. Thus, as used herein, the terms "three-way switch", "three-way system", "four-way switch", and "four-way system" mean such switches and systems that are subjected to the AC source voltage and carry the full load current.

A three-way switch derives its name from the fact that it has three terminals and is more commonly known as a single-pole double-throw (SPDT) switch, but will be referred to herein as a "three-way switch". Note that in some countries a three-way switch as described above is known as a "two-way switch".

A four-way switch is a double-pole double-throw (DPDT) switch that is wired internally for polarity-reversal applications. A four-way switch is commonly called an intermediate switch, but will be referred to herein as a "four-way switch".

In a typical, prior art three-way switch system, two three-way switches control a single lighting load, and each switch is fully operable to independently control the load, irrespective of the status of the other switch. In such a three-way switch system, one three-way switch must be wired at the AC power source side of the system (sometimes called "line side"), and the other three-way switch must be wired at the lighting load side of the system.

FIG. 1A shows a standard three-way switch system 100, which includes two three-way switches 102, 104. The switches 102, 104 are connected between an AC power source 106 and a lighting load 108. The three-way switches 102, 104 each include "movable" (or common) contacts, which are electrically connected to the AC power source 106 and the lighting load 108, respectively. The three-way switches 102, 104 also each include two fixed contacts. When the movable contacts are making contact with the upper fixed contacts, the three-way switches 102, 104 are in position A in FIG. 1A. When the movable contacts are making contact with the lower fixed contact, the three-way switches 102, 104 are in position B. When the three-way switches 102, 104 are both in position A (or both in position B), the circuit of system 100 is complete and the lighting load 108 is energized. When switch 102 is in position A and switch 104 is in position B (or vice versa), the circuit is not complete and the lighting load 108 is not energized.

Three-way dimmer switches that replace three-way switches are known in the art. An example of a three-way dimmer switch system 150, including one prior art three-way dimmer switch 152 and one three-way switch 104 is shown in FIG. 1B. The three-way dimmer switch 152 includes a dimmer circuit 152A and a three-way switch 152B. A typical, AC phase-control dimmer circuit 152A regulates the amount of energy supplied to the lighting load 108 by conducting for some portion of each half-cycle of the AC waveform, and not conducting for the remainder of the half-cycle. Because the dimmer circuit 152A is in series with the lighting load 108, the longer the dimmer circuit conducts, the more energy will be delivered to the lighting load 108. Where the lighting load 108 is a lamp, the more energy that is delivered to the lighting load 108, the greater the light intensity level of the lamp. In a typical dimming operation, a user may adjust a control to set the light intensity level of the lamp to a desired light intensity level. The portion of each half-cycle for which the dimmer conducts is based on the selected light intensity level. The user is able to dim and toggle the lighting load 108 from the three-way dimmer switch 152 and is only able to toggle the lighting load from the three-way switch 104. Since two dimmer circuits cannot be wired in series, the three-way dimmer switch system 150 can only include one three-way dimmer switch 152, which can be located on either the line side or the load side of the system.

A four-way switch system is required when there are more than two switch locations from which to control the load. For example, a four-way system requires two three-way switches and one four-way switch, wired in well known fashion, so as to render each switch fully operable to independently control the load irrespective of the status of any other switches in the system. In the four-way system, the four-way switch is required to be wired between the two three-way switches in order for all switches to operate independently, i.e., one three-way switch must be wired at the AC source side of the system, the other three-way switch must be wired at the load side of the system, and the four-way switch must be electrically situated between the two three-way switches.

FIG. 1C shows a prior art four-way switching system 180. The system 180 includes two three-way switches 102, 104 and a four-way switch 185. The four-way switch 185 has two states. In the first state, node A1 is connected to node A2 and node B1 is connected to node B2. When the four-way switch 185 is toggled, the switch changes to the second state in which the paths are now crossed (i.e., node A1 is connected to node B2 and node B1 is connected to node A2). Note that a four-way switch can function as a three-way switch if one terminal is simply not connected.

FIG. 1D shows another prior art switching system 190 containing a plurality of four-way switches 185. As shown, any number of four-way switches can be included between the three-way switches 102, 104 to enable multiple location control of the lighting load 108.

Multiple location dimming systems employing a smart dimmer and one or more specially-designed remote (or "accessory") dimmers have been developed. The remote dimmers permit the intensity level of the lighting load to be adjusted from multiple locations. A smart dimmer is one that includes a microcontroller or other processing means for providing an advanced set of control features and feedback options to the end user. For example, the advanced features of a smart dimmer may include a protected or locked lighting preset, fading, and double-tap to full intensity. The microcontroller controls the operation of the semiconductor switch to thus control the intensity of the lighting load.

To power the microcontroller, the smart dimmers include power supplies, which draw a small amount of current through the lighting load when the semiconductor switch is non-conductive each half-cycle. The power supply typically uses this small amount of current to charge a storage capacitor and develop a direct-current (DC) voltage to power the microcontroller. An example of a multiple location lighting control system, including a wall-mountable smart dimmer switch and wall-mountable remote switches for wiring at all locations of a multiple location dimming system, is disclosed in commonly assigned U.S. Pat. No. 5,248,919, issued on Sep. 28, 1993, entitled LIGHTING CONTROL DEVICE, which is herein incorporated by reference in its entirety.

Referring again to the system 150 of FIG. 1B, since no load current flows through the dimmer circuit 152A of the three-way dimmer switch 152 when the circuit between the AC power source 106 and the lighting load 108 is broken by either three-way switch 152B or 104, the dimmer switch 152 is not able to include a power supply and a microcontroller. Thus, the dimmer switch 152 is not able to provide the advanced set of features of a smart dimmer to the end user.

FIG. 2 shows an example multiple location lighting control system 200 including one wall-mountable smart dimmer 202 and one wall-mountable remote dimmer 204. The dimmer 202 has a hot (H) terminal for receipt of an AC source voltage provided by an AC power source 206, and a dimmed-hot (DH) terminal for providing a dimmed-hot (or phase-controlled) voltage to a lighting load 208. The remote dimmer 204 is connected in series with the DH terminal of the dimmer 202 and the lighting load 208, and passes the dimmed-hot voltage through to the lighting load 208.

The dimmer 202 and the remote dimmer 204 both have actuators to allow for raising, lowering, and toggling on/off the light intensity level of the lighting load 208. The dimmer 202 is responsive to actuation of any of these actuators to alter the intensity level or to power the lighting load 208 on/off accordingly. In particular, an actuation of an actuator at the remote dimmer 204 causes an AC control signal, or partially rectified AC control signal, to be communicated from that remote dimmer 204 to the dimmer 202 over the wiring between the accessory dimmer (AD) terminal of the remote dimmer 204 and the AD terminal of the dimmer 202. The dimmer 202 is responsive to receipt of the control signal to alter the dimming level or toggle the load 208 on/off. Thus, the load can be fully controlled from the remote dimmer 204.

The user interface of the dimmer 202 of the multiple location lighting control system 200 is shown in FIG. 3. As shown, the dimmer 202 may include a faceplate 310, a bezel 312, an intensity selection actuator 314 for selecting a desired level of light intensity of a lighting load 208 controlled by the dimmer 202, and a control switch actuator 316. An actuation of the upper portion 314A of the actuator 314 increases or raises the light intensity of the lighting load 208, while an actuation of the lower portion 314B of the actuator 314 decreases or lowers the light intensity.

The dimmer 202 may also include a visual display in the form of a plurality of light sources 318, such as light-emitting diodes (LEDs). The light sources 318 may be arranged in an array (such as a linear array as shown), and are illuminated to represent a range of light intensity levels of the lighting load 208 being controlled. The intensity levels of the lighting load 208 may range from a minimum intensity level, which may be the lowest visible intensity, but which may be "full off", or 0%, to a maximum intensity level, which is typically "full on", or substantially 100%. Light intensity level is typically expressed as a percent of full intensity. Thus, when the lighting load 208 is on, light intensity level may range from 1% to substantially 100%.

FIG. 4 is a simplified block diagram of the dimmer 202 and the remote dimmer 204 of the multiple location lighting control system 200. The dimmer 202 includes a bidirectional semiconductor switch 420, e.g., a triac or two field-effect transistors (FETs) in anti-series connection, coupled between the hot terminal H and the dimmed-hot terminal DH, to control the current through, and thus the light intensity of, the lighting load 208. The semiconductor switch 420 has a control input (or gate), which is connected to a gate drive circuit 424. The input to the gate renders the semiconductor switch 420 conductive or non-conductive, which in turn controls the power supplied to the lighting load 208. The gate drive circuit 424 provides control inputs to the semiconductor switch 420 in response to command signals from a microcontroller 426.

The microcontroller 426 receives inputs from a zero-crossing detector 430 and a signal detector 432 and controls the semiconductor switch 420 accordingly. The microcontroller 426 also generates command signals to a plurality of LEDs 418 for providing feedback to the user of the dimmer 202. A power supply 428 generates a DC output voltage $V_{CC}$ to power the microcontroller 426. The power supply is coupled between the hot terminal H and the dimmed hot terminal DH.

The zero-crossing detector 430 determines the zero-crossings of the input AC supply voltage from the AC power supply 206. A zero-crossing is defined as the time at which the AC supply voltage transitions from positive to negative polarity (i.e., a negative-going zero-crossing), or from negative to positive polarity (i.e., a positive-going zero-crossing), at the beginning of each half-cycle. The zero-crossing information is provided as an input to microcontroller 426. The microcontroller 426 provides the gate control signals to operate the semiconductor switch 420 to provide voltage from the AC power source 206 to the lighting load 208 at predetermined times relative to the zero-crossing points of the AC waveform.

Generally, two techniques are used for controlling the power supplied to the lighting load 208: forward phase control dimming and reverse phase control dimming. In forward phase control dimming, the semiconductor switch 420 is turned on at some point within each AC line voltage half-cycle and remains on until the next voltage zero-crossing. Forward phase control dimming is often used to control energy to a resistive or inductive load, which may include, for example, a magnetic low-voltage transformer or an incandescent lamp. In reverse phase control dimming, the semiconductor switch 420 is turned on at the zero-crossing of the AC line voltage and turned off at some point within each half-cycle of the AC line voltage. Reverse phase control is often used to control energy to a capacitive load, which may include, for example, an electronic low-voltage transformer. Since the semiconductor switch 420 must be conductive at the beginning of the half-cycle, and be able to be turned off with in the half-cycle, reverse phase control dimming requires that the dimmer have two FETs in anti-serial connection, or the like.

The signal detector 432 has an input 440 for receiving switch closure signals from momentary switches T, R, and L. Switch T corresponds to a toggle switch controlled by the switch actuator 316, and switches R and L correspond to the raise and lower switches controlled by the upper portion 314A and the lower portion 314B, respectively, of the intensity selection actuator 314.

Closure of switch T connects the input of the signal detector 432 to the DH terminal of the dimmer 202, and allows both positive and negative half-cycles of the AC current to flow through the signal detector. Closure of switches R and L also connects the input of the signal detector 432 to the DH terminal. However, when switch R is closed, current only flows through the signal detector 432 during the positive half-cycles of the AC power source 406 because of a diode 434. In similar manner, when switch L is closed, current only flows through the signal detector 432 during the negative half-cycles because of a diode 436. The signal detector 432 detects when the switches T, R, and L are closed, and provides two separate output signals representative of the state of the switches as inputs to the microcontroller 426. A signal on the first output of the signal detector 432 indicates a closure of switch R and a signal on the second output indicates a closure of switch L. Simultaneous signals on both outputs represents a closure of switch T. The microprocessor controller 426 determines the duration of closure in response to inputs from the signal detector 432.

The remote dimmer 204 provides a means for controlling the dimmer 202 from a remote location in a separate wall box. The remote dimmer 204 includes a further set of momentary switches T', R', and L' and diodes 434' and 436'. The wire connection is made between the AD terminal of the remote dimmer 204 and the AD terminal of the dimmer 202 to allow for the communication of actuator presses at the remote switch. The AD terminal is connected to the input 440 of the signal detector 432. The action of switches T', R', and L' in the remote dimmer 204 corresponds to the action of switches T, R, and L in the dimmer 202.

Since the remote dimmer 204 does not have LEDs, no feedback can be provided to a user at the remote dimmer 204. Therefore there is a need for multiple location dimming system in which the remote devices include visual displays for providing feedback to a user.

SUMMARY OF THE INVENTION

As described herein, a load control system for controlling the power delivered to an electrical load from an AC power source comprises a main load control device for controlling the electrical load and a remote load control device. The main load control device is adapted to conduct a load current from the AC power source to the electrical load. The main load control device comprises a receiver for receiving digital messages, such that the main load control device is operable to control the electrical load in response to the received digital messages. The remote load control device is adapted to be coupled in series electrical connection with the main load control device between the AC power source and the electrical load, such that the remote load control device is operable to conduct the load current from the AC power source to the electrical load. The remote load control device comprises a power supply operable to charge through the main load control device during a first time period of a half-cycle of the AC power source. The remote load control device also comprises a transmitter for transmitting digital messages. The receiver of the main load control device and the transmitter of the remote load control device are coupled together such that the transmitter of the remote load control device is operable to transmit at least a portion of a digital message to the receiver of the main load control device during a second time period of the half-cycle.

A load control device adapted for use in a load control system for controlling the power delivered to an electrical load from an AC power source is also described herein. The load control system comprises a remote control device having a power supply. The load control device comprises a load control circuit adapted to be coupled in series electrical connection between the AC power source and the electrical load to control the power delivered to the electrical load, a controller operatively coupled to the load control circuit for controlling the power delivered to the electrical load, a switching circuit operable to be rendered conductive by the controller to allow a power supply of the remote control device to charge during a first time period of a half-cycle of the AC power source, and a receiver coupled to the controller for receiving digital messages, the receiver adapted to be coupled to the transmitter of the remote control device such that the controller is operable to receive at least a portion of a digital message from the transmitter of the remote load control device during a second time period of the half-cycle.

A method of controlling an amount of power delivered to an electrical load from an AC power source in a load control system including a main load control device and a remote load control device comprises the steps of: (1) the main load control device rendering a switching circuit conductive to conduct a charging current of a power supply of the remote load control device during a first time period of a half-cycle of the AC power source, the first time period occurring at approximately the same time each half-cycle; and (2) the main load control device receiving digital messages from the remote load control device during a second time period of the half-cycle; and (3) the main load control device adjusting the amount of power delivered to the load in response to the digital messages transmitted by the remote load control device.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form, which is presently preferred, it being understood, however, that the invention is not limited to the precise arrangements and instrumentalities shown. The features and advantages of the present invention will become apparent from the following description of the invention that refers to the accompanying drawings, in which:

FIG. 20 is a simplified flowchart of a Release routine of the user interface procedure of FIG. 17;

DETAILED DESCRIPTION OF EMBODIMENTS OF THE INVENTION

Figure 1A:
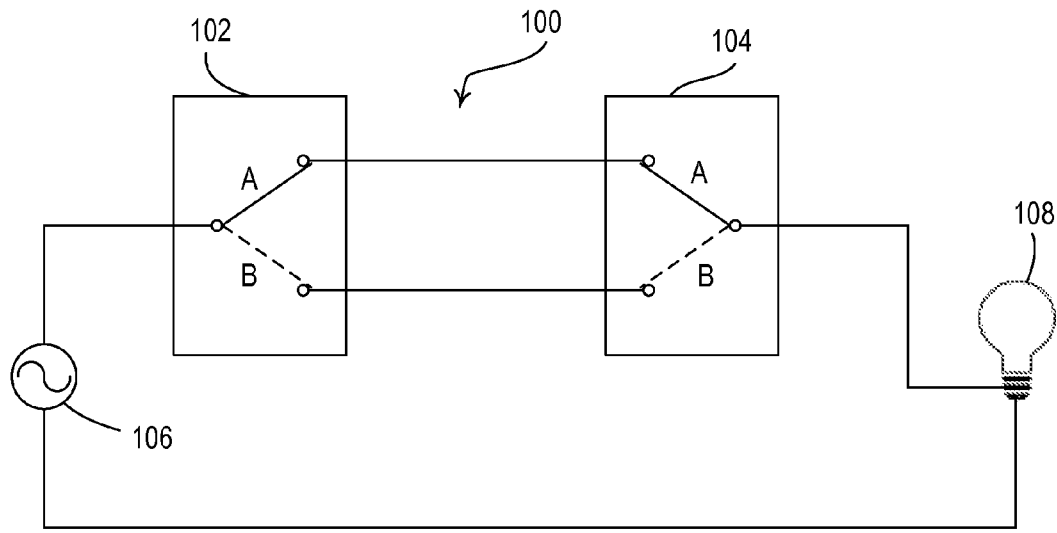
FIG. 1A shows a prior art three-way switch system, which includes two three-way switches.
Figure 1B:
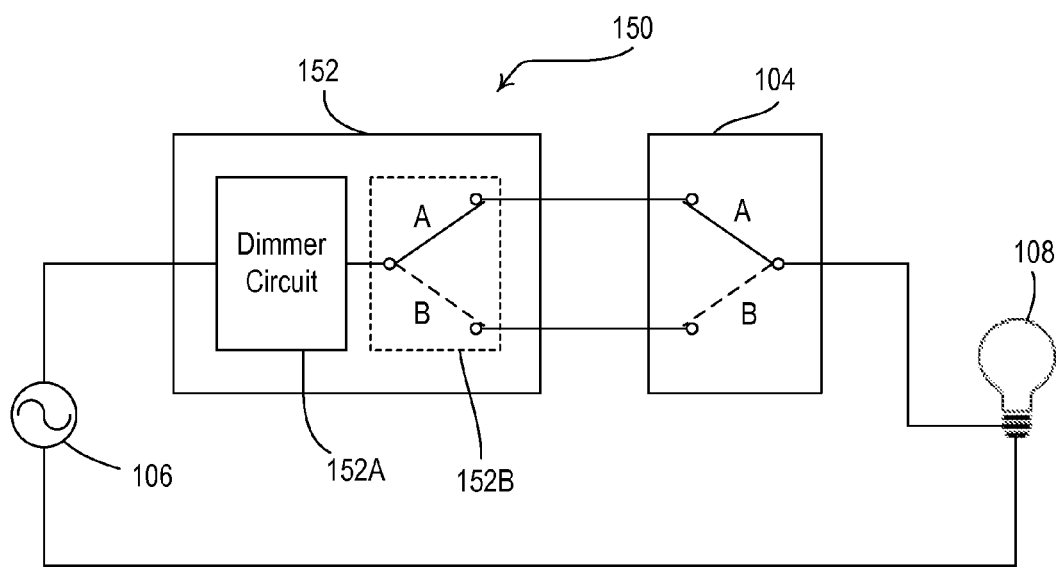
FIG. 1B shows an example of a prior art three-way dimmer switch system including one prior art three-way dimmer switch and one three-way switch.
Figure 1C:
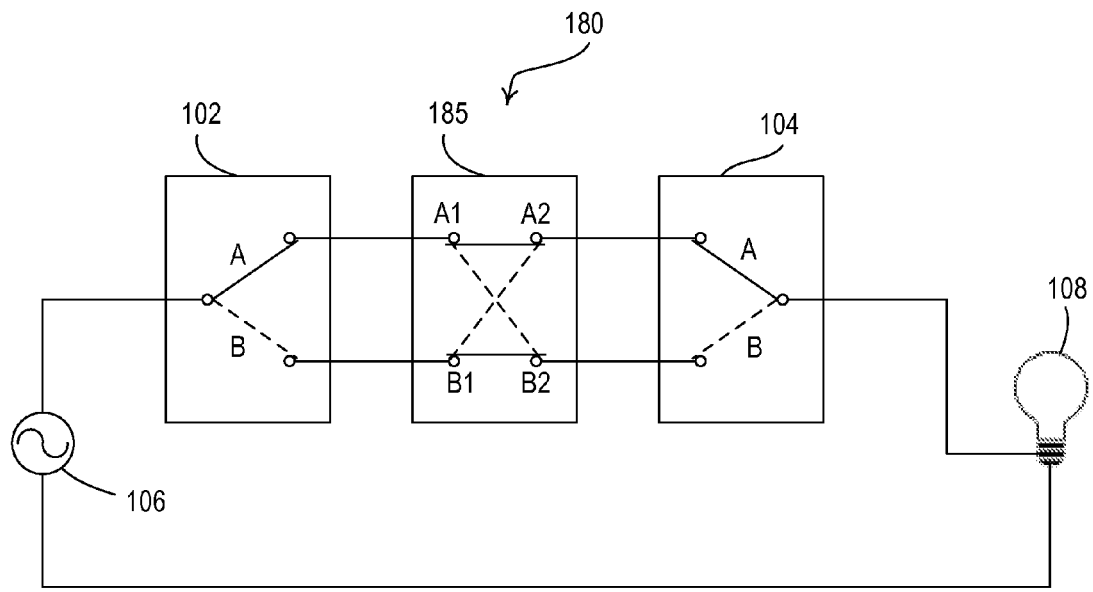
FIG. 1C shows a prior art four-way switching system.
Figure 1D:
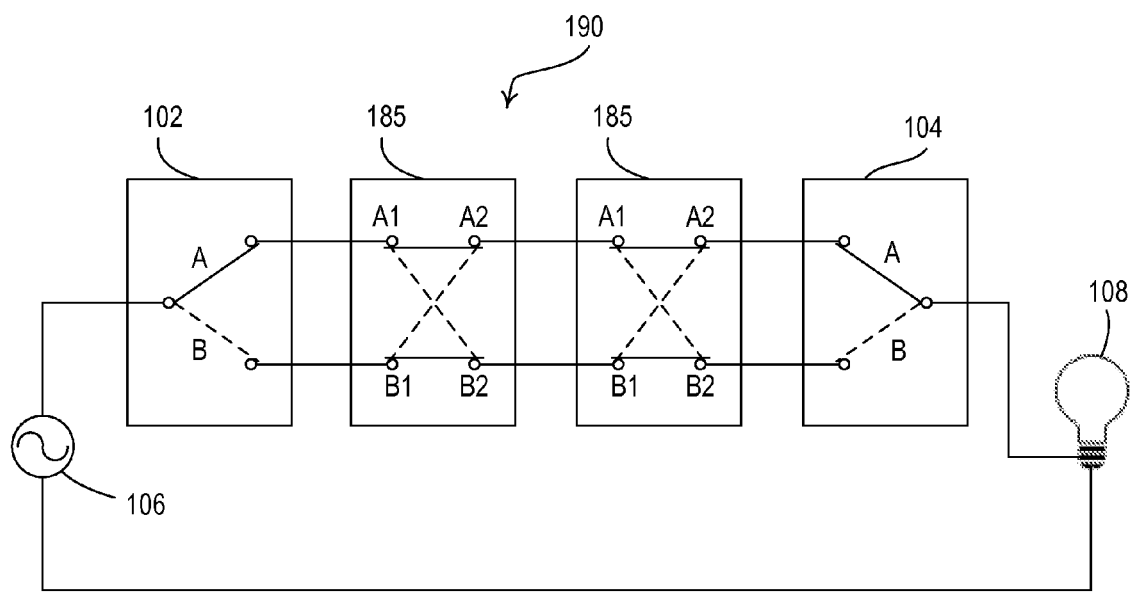
FIG. 1D shows a prior art extended four-way switching system.
Figure 2:
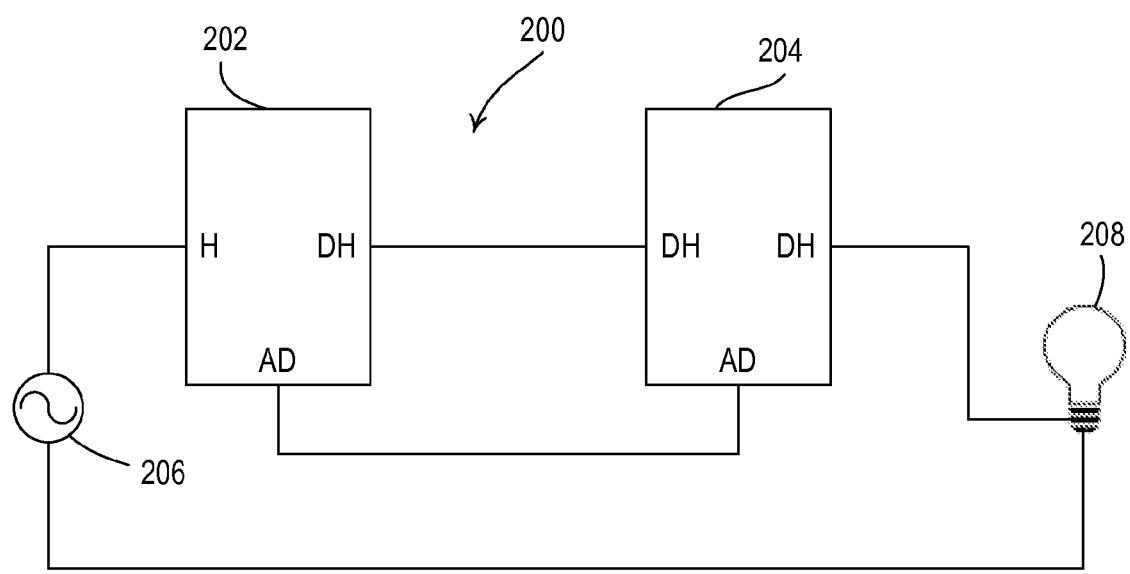
FIG. 2 is a simplified block diagram of a typical prior art multiple location lighting control system having a dimmer switch and a remote switch.
Figure 3:
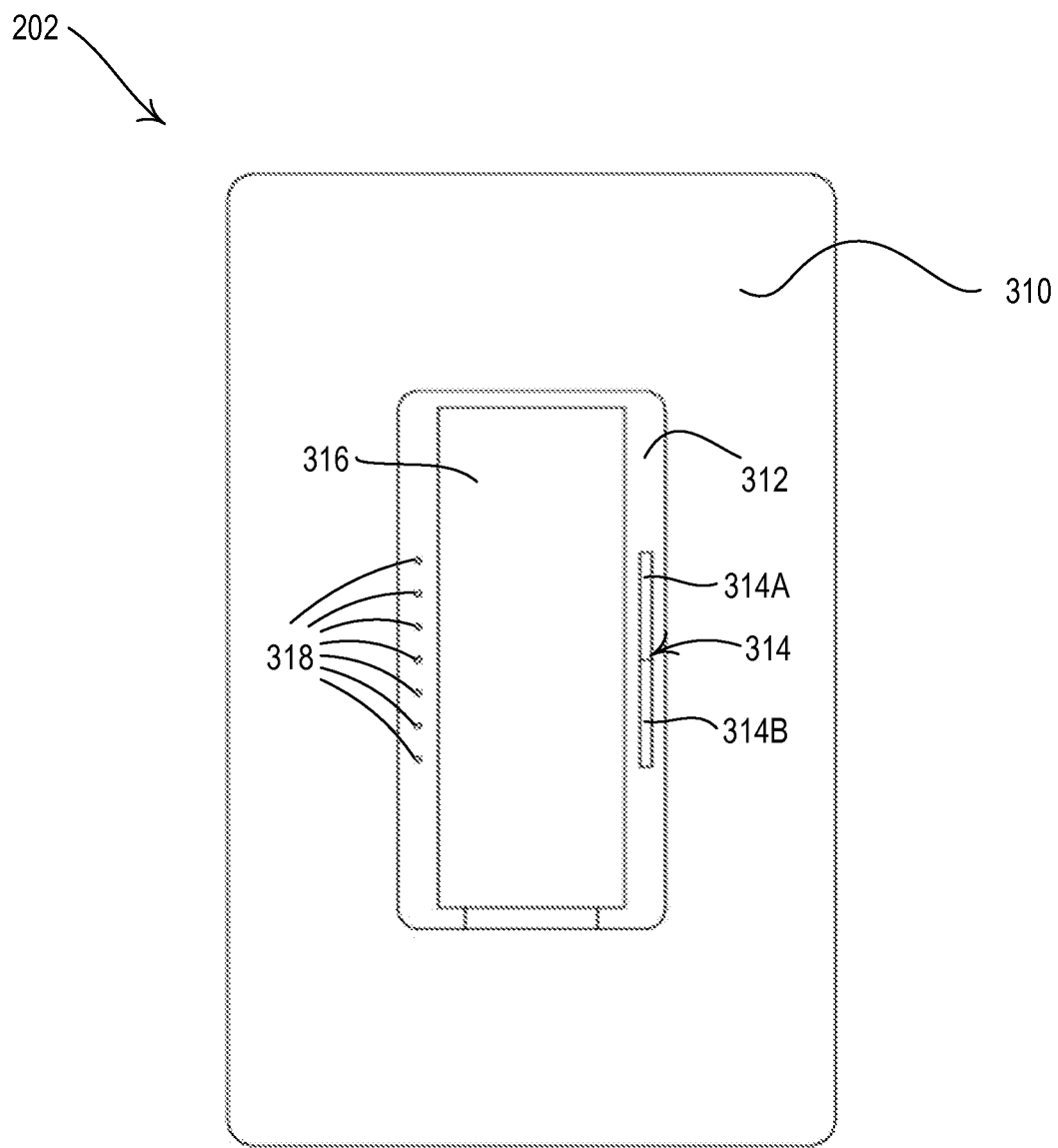
FIG. 3 is a front view of a user interface of the dimmer switch of the multiple location lighting control system of FIG. 2.
Figure 4:
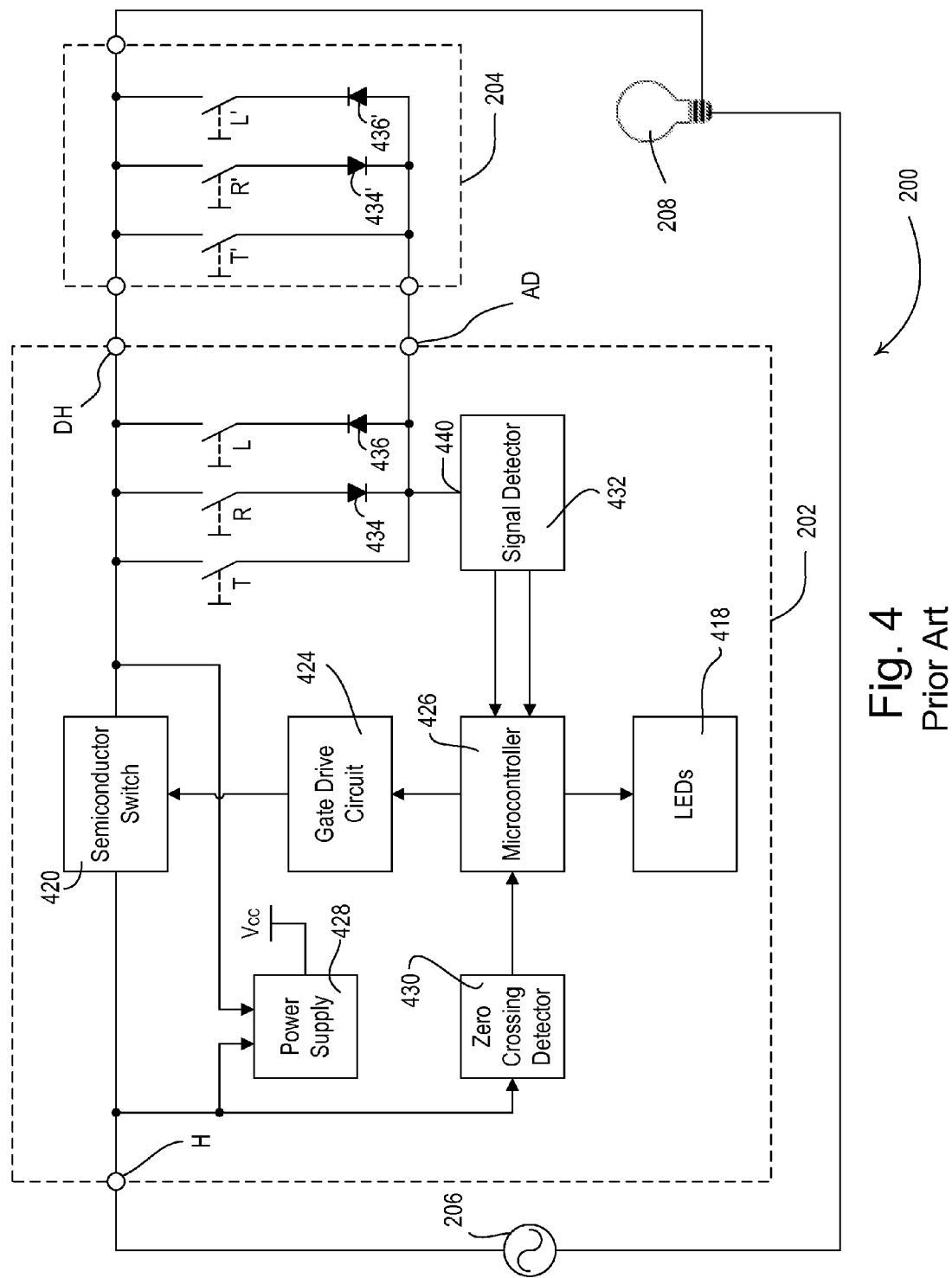
FIG. 4 is a simplified block diagram of the dimmer switch and the remote switch of the multiple location lighting control system of FIG. 2.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 5:
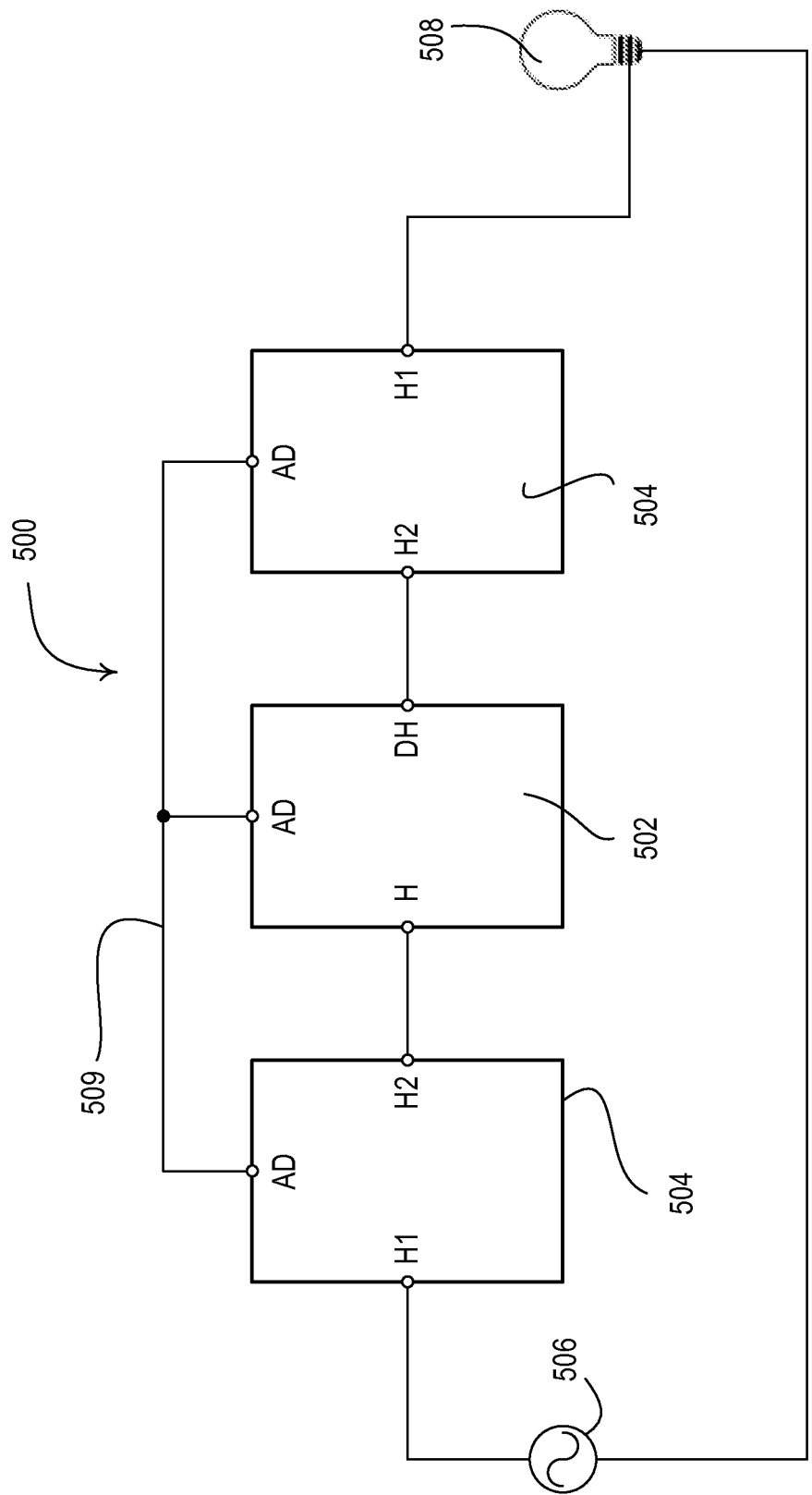
FIG. 5 is a simplified block diagram of a multiple location dimming system having a main dimmer and two remote dimmers according to a first embodiment of the present invention.

FIG. 5 is a simplified block diagram of a multiple location dimming system 500 according to a first embodiment of the present invention. As shown in FIG. 5, a main dimmer 502 and two remote dimmers 504 (i.e., accessory dimmers) are coupled in series electrical connection between an AC power source 506 and a lighting load 508. The main dimmer 502 includes a hot terminal H (i.e., a line-side load terminal) adapted to be coupled to the line-side of the system 500 and a dimmed-hot terminal DH (i.e., a load-side terminal) adapted to be coupled to the load-side of the system 500. The main dimmer further comprises a load control circuit coupled between the hot and dimmed-hot terminals for controlling the amount of power delivered to the lighting load 508 (as will described in greater detail with reference to FIG. 7). The remote dimmers 504 include two hot terminals H1, H2, which conduct the load current from the AC power source 506 to the lighting load 508. The main dimmer 502 and the remote dimmers 504 each comprise accessory dimmer terminals AD coupled together via a single accessory dimmer (AD) line 509 (i.e., an accessory wiring). The main dimmer 502 and the remote dimmers 504 are operable to communicate, i.e., transmit and receive digital messages, via the AD line 509. The main dimmer 502 and the remote dimmers 504 do not require connections to the neutral side of the AC power source 506.

The main dimmer 502 may be wired into any location of the multiple location dimming system 500. For example, the main dimmer 502 may be wired in the middle of the two remote dimmers 504, i.e., a first remote dimmer may be wired to the line side of the system 500 and a second remote dimmer may be wired to the load side of the system 500 (as shown in FIG. 5). Alternatively, the main dimmer 502 may be wired to the line side or the load side of the system 500. Further, more than two remote dimmers 504 (e.g., up to four remote dimmers) may be provided in the multiple location dimming system 500.

The main dimmer 502 and the remote dimmer 504 all include actuators and visual displays, such that lighting load 508 may be controlled from and feedback of the lighting load may be provided at each of the main dimmer 502 and the remote dimmers 504. In order to provide the visual displays at the remote dimmers 504, the remote dimmers each include a controller (e.g., a microprocessor) and a power supply for powering the microprocessor. The main dimmer 502 provides an AD supply voltage $V_{AD}$ (e.g., approximately 80 $V_{DC}$) on the AD line 509 to enable the power supplies of the remote dimmers 504 to charge during a first portion (i.e., a charging time $T_{CHRG}$) of each half-cycle of the AC power source 506. During a second portion (i.e., a communication time $T_{COMM}$) of each half-cycle, the main dimmer 502 and the remote dimmers 504 are operable to transmit and receive the digital messages via the AD line 509.

Figure 6:
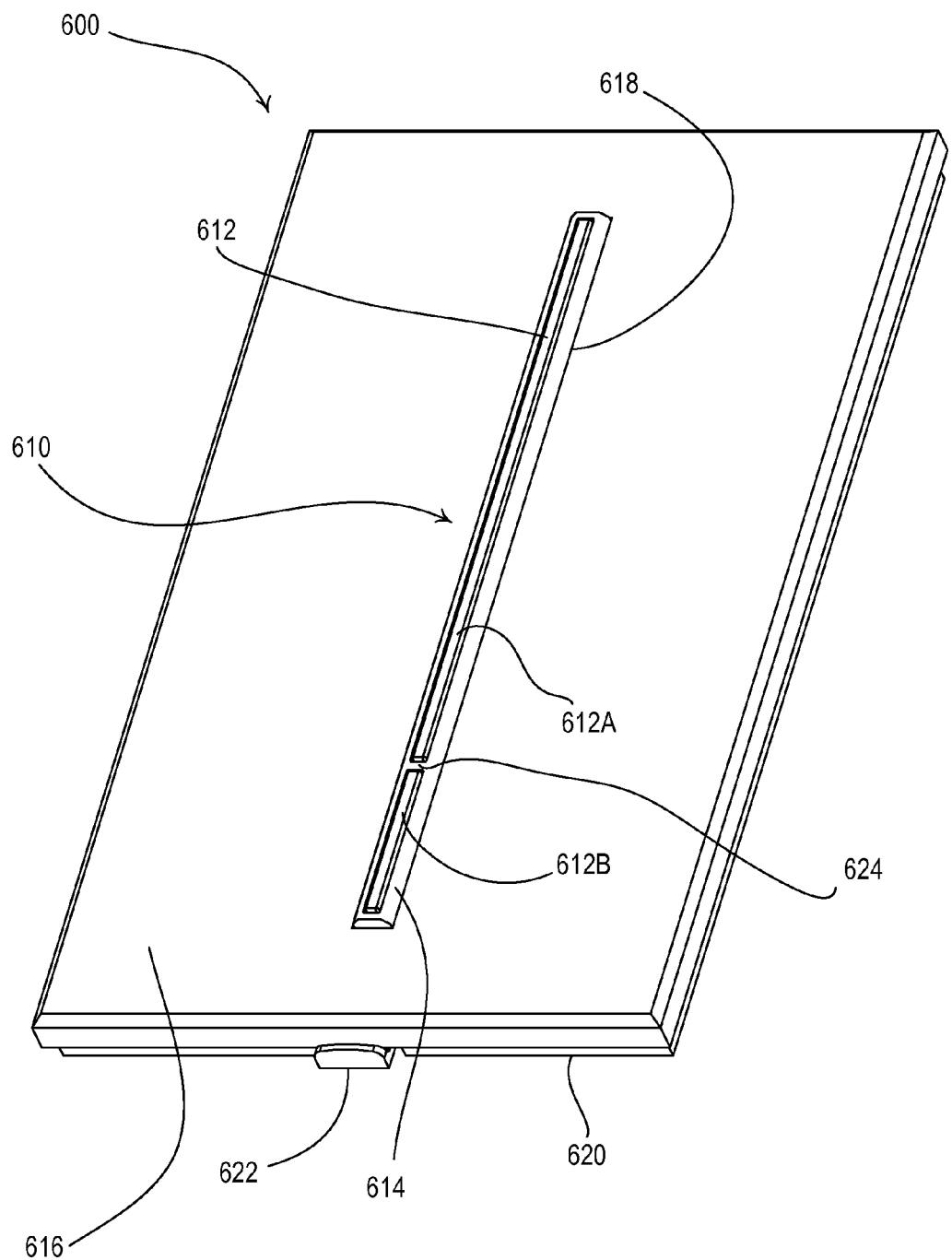
FIG. 6 is a perspective view of a user interface of the main dimmer and the remote dimmers of the system of FIG. 5.

FIG. 6 is a perspective view of a user interface 600 of the main dimmer 502 and the remote dimmers 504. The user interface 600 includes a thin touch sensitive actuator 610 comprising an actuation member 612 having first and second portions 612A, 612B. The actuation member 612 extends through a bezel 614 to contact a touch sensitive device (not shown) located inside the main dimmer 502 (and the remote dimmers 504). The main dimmer 502 is operable to control the intensity of a connected lighting load 508 in response to actuations of the actuation member 612 of either the main dimmer 502 or the remote dimmers 504.

The user interface 600 further comprises a faceplate 616, which has a non-standard opening 618 and mounts to an adapter 620. The bezel 614 is housed behind the faceplate 616 and extends through the opening 618. The adapter 620 connects to a yoke (not shown), which is adapted to mount the main dimmer 502 and the remote dimmers 504 to standard electrical wallboxes. An air-gap actuator 622 allows for actuation of an internal air-gap switch 722 (FIG. 7) by pulling the air-gap actuator down.

The bezel 614 comprises a break 624, which separates the lower portion 612A and the upper portion 612B of the actuation member 612. Upon actuation of the lower portion 612B of the actuation member 612, the main dimmer 502 causes the connected lighting load 508 to toggle from on to off (and vice versa). Actuation of the upper portion 612A of the actuation member 612, i.e., above the break 624, causes the intensity of the lighting load 508 to change to a level dependent upon the position of the actuation along the length of the actuation member 612.

A plurality of visual indicators, e.g., a plurality of light-emitting diodes (LEDs), are arranged in a linear array behind the actuation member 612. The actuation member 612 is substantially transparent, such that the LEDs are operable to illuminate portions of the actuation member. Two different color LEDs may be located behind the lower portion 612B, such that the lower portion is illuminated, for example, with blue light when the lighting load 508 is on and with orange light with the lighting load is off. The LEDs behind the upper portion 612A are, for example, blue and are illuminated as a bar graph to display the intensity of the lighting load 508 when the lighting load is on.

The touch sensitive actuator 610 of the user interface 600 is described in greater detail in co-pending commonly-assigned U.S. patent application Ser. No. 11/471,908, filed Jun. 20, 2006, entitled TOUCH SCREEN ASSEMBLY FOR A LIGHTING CONTROL, and U.S. Provisional Patent Application Ser. No. 60/925,821, filed Apr. 23, 2007, entitled LOAD CONTROL DEVICE HAVING A MODULAR ASSEMBLY. The entire disclosures of both patent applications are hereby incorporated by reference.

Figure 7:
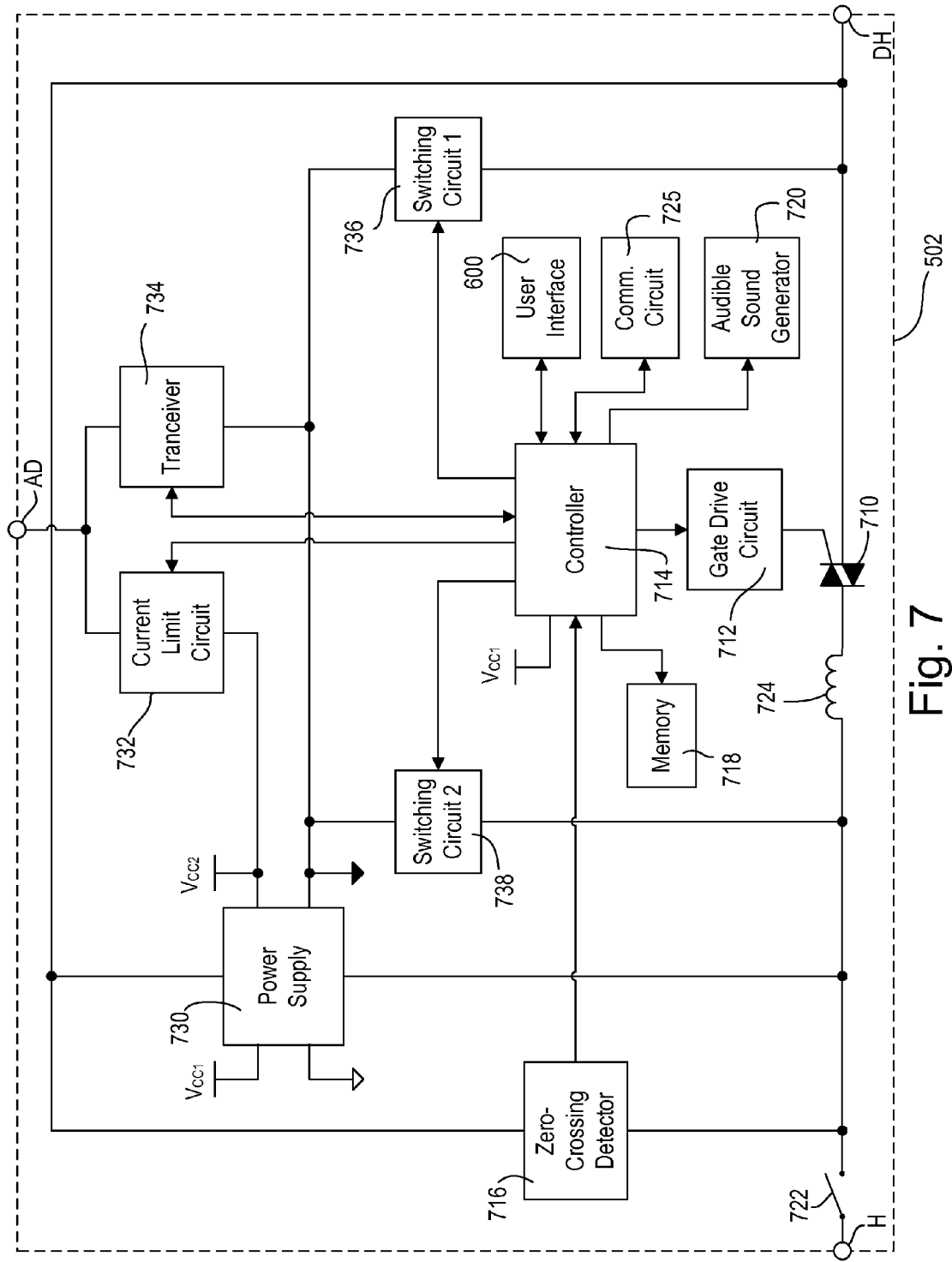
FIG. 7 is a simplified block diagram of the main dimmer of the system of FIG. 5.

FIG. 7 is a simplified block diagram of the main dimmer 502 according to a first embodiment of the present invention. The main dimmer 502 employs a bidirectional semiconductor switch 710, e.g., a triac, coupled between the hot terminal H and the dimmed hot terminal DH, to control the current through, and thus the intensity of, the lighting load 508. The semiconductor switch 710 could alternatively be implemented as any suitable bidirectional semiconductor switch, such as, for example, a FET in a full-wave rectifier bridge, two FETs in anti-series connection, or one or more insulated-gate bipolar junction transistors (IGBTs). The semiconductor switch 710 has a control input (or gate), which is connected to a gate drive circuit 712. The input to the gate renders the semiconductor switch 710 selectively conductive or non-conductive, which in turn controls the power supplied to the lighting load 508.

A controller 714 is operable to control the semiconductor switch 710 by providing a control signal to the gate drive circuit 712 using the forward phase control dimming technique. The controller 714 may be any suitable controller, such as a microcontroller, a microprocessor, a programmable logic device (PLD), or an application specific integrated circuit (ASIC). The controller is coupled to a zero-crossing detect circuit 716, which determines the zero-crossing points of the AC line voltage from the AC power supply 506. The controller 714 generates the gate control signals to operate the semiconductor switch 210 to thus provide voltage from the AC power supply 506 to the lighting load 508 at predetermined times relative to the zero-crossing points of the AC line voltage.

The user interface 600 is coupled to the controller 714, such that the controller is operable to receive inputs from the touch sensitive actuator 610 and to control the LEDs to provide feedback of the amount of power presently being delivered to the lighting load 508. The electrical circuitry of the user interface 600 is described in greater detail in co-pending, commonly-assigned U.S. patent application Ser. No. 11/471,914, filed Jun. 20, 2006, entitled FORCE INVARIANT TOUCH SCREEN, the entire disclosure of which is hereby incorporated by reference.

The main dimmer 502 further comprises an audible sound generator 718 coupled to the controller 714. The controller 714 is operable to cause the audible sound generator 718 to produce an audible sound in response to an actuation of the touch sensitive actuator 610. A memory 720 is coupled to the controller 714 and is operable to store control information of the main dimmer 502.

The air-gap switch 722 is coupled in series between the hot terminal H and the semiconductor switch 710. The air-gap switch 722 has a normally-closed state in which the semiconductor switch 710 is coupled in series electrical connection between the AC power source 506 and the lighting load 508. When the air-gap switch 722 is actuated (i.e., in an open state), the air-gap switch provides an actual air-gap break between the AC power source 506 and the lighting load 508. The air-gap switch 722 allows a user to service the lighting load 508 without the risk of electrical shock. The main dimmer 502 further comprises an inductor 724, i.e., a choke, for providing electromagnetic interference (EMI) filtering.

The main dimmer 502 includes a power supply 730, e.g., a flyback power supply, which provides both isolated and non-isolated DC output voltages. The power supply 730 only draws current at the beginning of each half-cycle while the bidirectional semiconductor switch 710 is non-conductive. The power supply 730 stops drawing current when the bidirectional semiconductor switch 710 is rendered conductive. The power supply 730 may comprise a transformer (not shown). The power supply 730 may provide four output voltages, some of which may be provided by alternate windings of the transformer. The power supply 730 supplies a first isolated DC output voltage $V_{CC1}$ (e.g., 3.4 $V_{DC}$) for powering the controller 714 and other low voltage circuitry of the main dimmer 502. The power supply 730 also generates a second non-isolated DC output voltage $V_{CC2}$ (e.g., 80 $V_{DC}$), for providing power for the AD line 509 as will be described in greater detail below. The power supply 730 also provides a third non-isolated DC output voltage $V_{CC3}$ (e.g., 12 $V_{DC}$) and a fourth non-isolated DC output voltage $V_{CC4}$ (e.g., 5 $V_{DC}$), which are not shown in FIG. 7. The second, third, and fourth non-isolated voltages $V_{CC2}$, $V_{CC3}$, $V_{CC4}$ are all referenced to a non-isolated circuit common. An example of the power supply 730 is described in greater detail in commonly-assigned U.S. Provisional Patent Application, 61/015,965, filed the same day as the present application, entitled POWER SUPPLY FOR A LOAD CONTROL DEVICE, the entire disclosure of which is hereby incorporated by reference.

A current limit circuit 732 is coupled between the second DC output voltage $V_{CC2}$ of the power supply 730 and the accessory dimmer terminal AD (via an output connection CL_OUT) to provide the AD supply voltage $V_{AD}$ to the remote dimmers 504. The current limit circuit 732 limits the magnitude of the current provided to the remote dimmers 504 to charge the internal power supplies. The controller 714 is operable to adjust the current limit value of the current limit circuit 732 to a first current limit level (e.g., approximately 150 mA) during the charging time period $T_{CHRG}$ each half-cycle to limit the current that the remote dimmers 504 can draw to charge their internal power supplies. The controller 714 is further operable to adjust the current limit to a second current limit level (e.g., 10 mA) during the communication time period $T_{COMM}$ each half-cycle. The controller 714 provides a control signal I_LIMIT to the current limit circuit 732 to adjust the current limit between the first and second current limit levels.

A transceiver 734 allows for the communication of digital message between the main dimmer 502 and the remote dimmer 504. The transceiver 734 is coupled to the accessory dimmer terminal AD (via a connection TX/RX). The transceiver 734 comprises a transmitter 900 (FIG. 9) for transmitting digital signals on the AD line 509 and a receiver 920 (FIG. 9) for receiving digital signals from the remote dimmers 504 coupled to the AD line. The controller 714 processes the received digital messages RX_SIG from the receiver 920 and provides the digital messages TX_SIG to be transmitted to the transmitter 900.

The main dimmer 730 further comprises first and second switching circuits 736, 738. The switching circuits 736, 738 are coupled to the dimmed-hot terminal DH and the hot terminal H (through the air-gap switch 722), respectively. The controller 714 provides a first control signal SW1_CTL to the first switching circuit 736 and a second control signal SW2_CTL to second switching circuit 738. The controller 714 controls the switching circuits 736, 738 to be conductive and non-conductive on a complementary basis. During the positive half-cycles, the controller 714 controls the first switching circuit 736 to be conductive, such that the power supply 730, the current limit circuit 732, and the transceiver 734 are coupled between the accessory dimmer terminal AD and the dimmed-hot terminal DH. This allows the remote dimmer 504 on the load side of the system 500 to charge the internal power supplies and transmit and receive digital messages during the positive half-cycles. During the negative half-cycles, the controller 714 controls the second switching circuit 738 to be conductive, such that the power supply 730, the current limit circuit 732, and the transceiver 734 are coupled between the accessory dimmer terminal AD and the hot terminal H to allow the remote dimmers 504 on the line side of the system 500 to charge their power supplies and communicate on the AD line 509. Accordingly, the first and second switching circuits provide first and second charging paths for the internal power supplies of the load-side and line-side remote dimmers 504, respectively, which both may be enabled by the controller 714.

The main dimmer 502 may also comprise another communication circuit 725 (in addition to the transceiver 734) for transmitting or receiving digital messages via a communications link, for example, a wired serial control link, a power-line carrier (PLC) communication link, or a wireless communication link, such as an infrared (IR) or a radio frequency (RF) communication link. An example of an RF communication link is described in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

Figure 8:
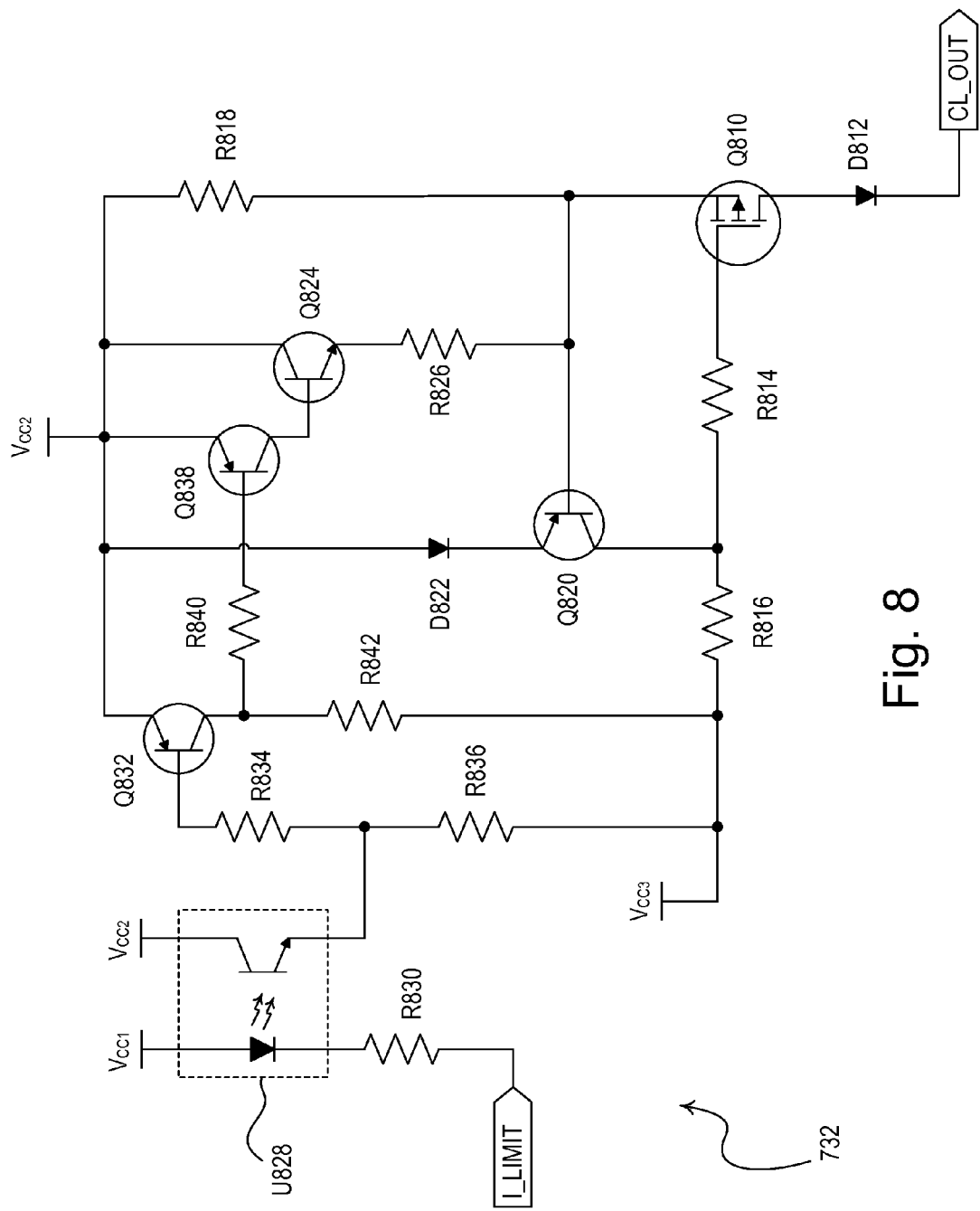
FIG. 8 is a simplified schematic diagram of a current limit circuit of the main dimmer of FIG. 7.

FIG. 8 is a simplified schematic diagram of the current limit circuit 732. The current limit circuit 732 limits the current conducted through the accessory dimmer terminal AD. The current through the output connection CL_OUT of the current limit circuit 732 is conducted from the second non-isolated DC voltage $V_{CC2}$ through a FET Q810 and a diode D812. The current limit circuit 732 is operable to limit the current to two discrete current limit levels, i.e., approximately 150 mA and 10 mA, which are controlled in response to the control signal I_LIMIT from the controller 714. During normal operation (i.e., when the current through the output connection CL_OUT is not exceeding either of the current limit levels), the gate of the FET Q810 is coupled to the third non-isolated DC voltage $V_{CC3}$ via two resistors R814, R816 (e.g., having resistances of approximately 10 kΩ and 470 kΩ, respectively). Accordingly, the voltage at the gate of the FET Q810 is set at the appropriate level such that the FET is conductive. The FET Q840 may be part number BSP317P, manufactured by Infineon Technologies.

When the control signal I_LIMIT is high (i.e., at approximately the magnitude of the first isolated DC voltage $V_{CC1}$), the current through the output connection CL_OUT of the current limit circuit 732 is limited to approximately 10 mA. At this time, the current through the output connection CL_OUT is conducted from the second non-isolated DC voltage $V_{CC2}$ to the FET Q810 through a first current limit resistor R818 (e.g., having a resistance of 220Ω). When the current increases to approximately 10 mA, the voltage developed across the resistor R818 exceeds approximately the base-emitter voltage of a PNP bipolar junction transistor (BJT) Q820 plus the forward voltage of a diode D822. Accordingly, the transistor Q820 becomes conductive, thus pulling the gate of the FET Q810 up towards the second non-isolated DC voltage $V_{CC2}$. This causes the FET Q810 to become non-conductive, thus limiting the current through the output connection CL_OUT to approximately 10 mA. The transistor Q820 may be part number MBT3906DW, manufactured by On Semicondcutor.

When the control signal I_LIMIT is pulled low to circuit common (i.e., to substantially zero volts), the current limit is alternatively set at 150 mA. Specifically, an NPN bipolar junction transistor Q824 is rendered conductive to couple a second current limit resistor R826 in parallel electrical connection with the first current limit resistor. The second current limit resistor R826 may have a resistance of 3.01 kΩ, such that the resulting equivalent resistance coupled in series between the second non-isolated DC voltage $V_{CC2}$ and the FET Q810 causes the current limit level to increase to approximately 150 mA. The transistor Q824 may be part number MPSA06, manufactured by On Semiconductor.

An input photodiode of an optocoupler U828 is coupled in series with a resistor R830 (e.g., having a resistance of 2.2 kΩ) between the first isolated DC output voltage $V_{CC1}$ and the control signal I_LIMIT. An output phototransistor of the optocoupler U828 is coupled to the base of a PNP bipolar junction transistor Q832 (e.g., part number BC856BW, manufactured by Philips Semiconductors) through a resistor R834. While the control signal I_LIMIT is high, the base of the transistor Q832 is pulled down towards the third non-isolated DC voltage $V_{CC3}$ through the resistor R834 and a resistor R836, which may have resistances of 4.7 kΩ and 220 kΩ, respectively. The optocoupler U828 may be part number PS2811, manufactured by NEC Electronics Corporation.

When the control signal I_LIMIT is pulled low, the voltage at the base of the transistor Q832 is pulled up towards the second non-isolated DC voltage $V_{CC2}$, such that the transistor Q832 becomes non-conductive. Accordingly, the voltage at the base of a PNP bipolar junction transistor Q838 is pulled down towards the third non-isolated DC voltage $V_{CC3}$ through two resistors R840, R842, e.g., having resistances of 4.7 kΩ and 470 kΩ, respectively. Thus, the transistor Q838 becomes conductive and pulls the base of the transistor Q824 up towards the second non-isolated DC voltage $V_{CC2}$, such that the transistor Q824 is conductive and the second current limit resistor R826 is coupled in parallel with the first current limit resistor R818.

Figure 9:
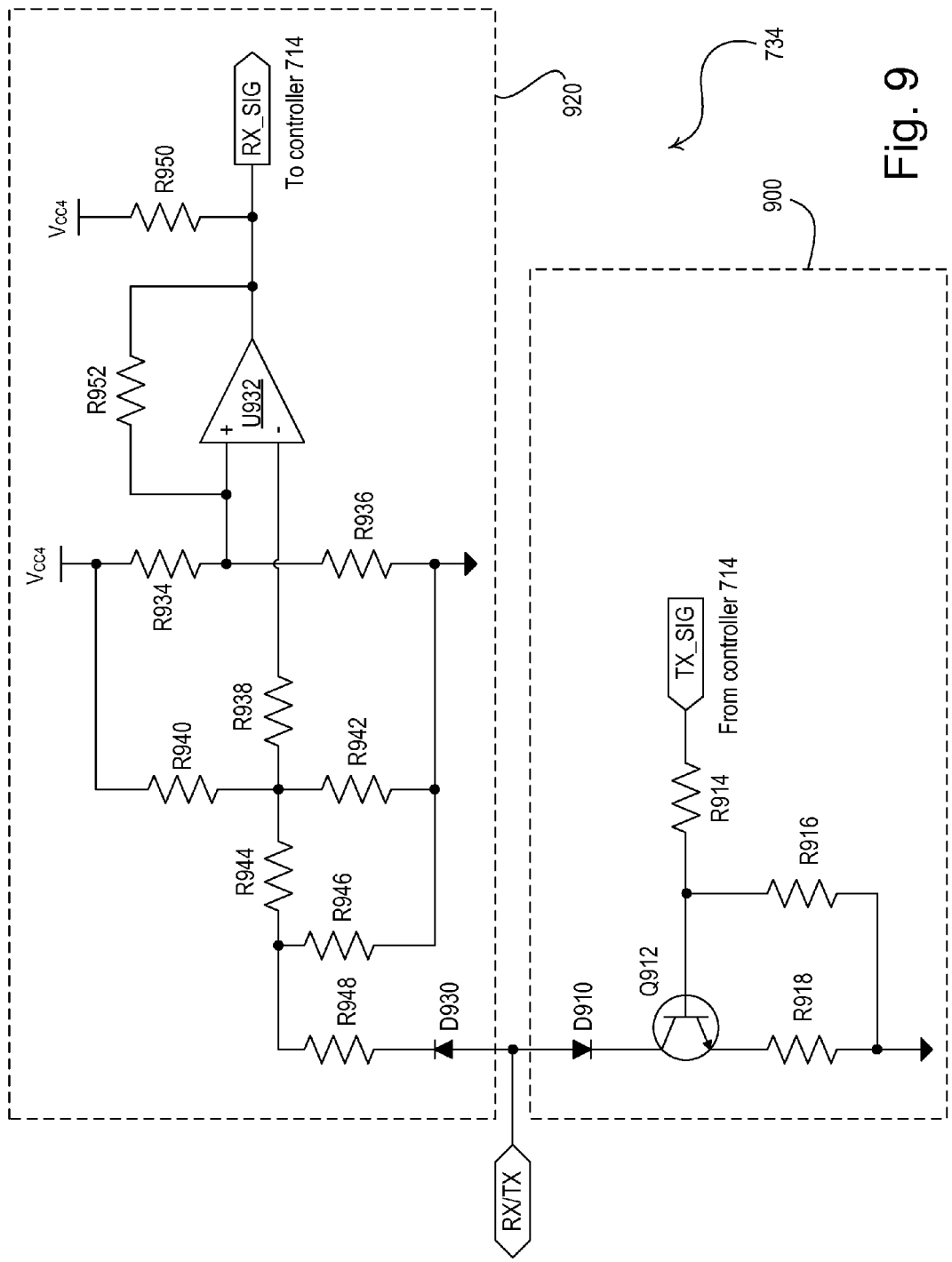
FIG. 9 is a simplified diagram of a transceiver of the main dimmer of FIG. 7.

FIG. 9 is a simplified schematic diagram of the transceiver 734, which comprises the transmitter 900 and the receiver 920. The transmitter 900 and the receiver 920 are coupled to the connection RX/TX through two diodes D910, D930, such that current is only operable to flow from the accessory dimmer terminal AD into the transmitter 900 and the receiver 920. The transmitter 900 comprises an NPN bipolar junction transistor Q912 coupled to the accessory dimmer terminal AD through the diode D910. The transistor Q912 may be part number MMBT6517, manufactured by On Semiconductor.

The controller 714 is operable to transmit digital messages on the AD line 509 by controlling the transistor Q912 to be conductive and non-conductive. The digital messages TX_SIG to be transmitted are provided from the controller 714 to the base of the transistor Q912 via a resistor R914 (e.g., having a resistance of 10 kΩ). The base of the transistor Q912 is also coupled to the non-isolated circuit common through a resistor R916 (e.g., having a resistance of 56 kΩ). The emitter of the transistor Q912 is coupled to the non-isolated circuit common through a resistor R918 (e.g., having a resistance of 220Ω). When the digital message TX_SIG provided by the controller 714 is low, the transistor Q912 remains non-conductive. When the digital message TX_SIG provided by the controller 714 is high (i.e., at approximately the fourth non-isolated DC voltage $V_{CC4}$), the transistor Q912 is rendered conductive, thus "shorting" the AD line 509, i.e., reducing the magnitude of the voltage on the AD line to substantially zero volts. The resistor R918 limits the magnitude of the current that flows through the accessory dimmer terminal AD when the transistor Q912 is conductive.

The controller 714 is operable to receive digital messages from the AD line 509 via the receiver 920. The receiver 920 comprises a comparator U932 having an output that provides the received digital messages RX_SIG to the controller 714. For example, the comparator U932 may be part number LM2903, manufactured by National Semiconductor. Two resistors R934, R936 are coupled in series between the DC voltage $V_{CC4}$ and circuit common and may have resistances of 68.1 kΩ and 110 kΩ, respectively. A reference voltage $V_{REF}$ is generated at the junction of the resistors R934, R936 and is provided to a non-inverting input of the comparator U932. An inverting input of the comparator U932 is coupled to the accessory dimmer terminal AD through a network of resistors R938, R940, R942, R944, R946, R948. For example, the resistors R938, R940, R942, R944, R946, R948 have resistances of 220 kΩ, 68.1 kΩ, 220 kΩ, 47.5 kΩ, 20 kΩ, and 220 kΩ, respectively. The output of the comparator U932 is coupled to the DC voltage $V_{CC4}$ via a resistor R950 (e.g., having a resistance of 4.7 kΩ).

The output of the comparator U932 is also coupled to the non-inverting input via a resistor R952 to provide some hysteresis. For example, the resistor R952 may have a resistance of 820 kΩ, such that when the output of the comparator U932 is pulled high to the DC voltage $V_{CC4}$, the reference voltage $V_{REF}$ at the non-inverting input of the comparator U932 has a magnitude of approximately 3.1 V. When the output of the comparator U932 is driven low, the reference voltage $V_{REF}$ has a magnitude of approximately 2.9 V.

If neither the main dimmer 502 nor the remote dimmers 504 are shorting out the AD line 509, the second non-isolated DC output voltage $V_{CC2}$ (i.e., 80 $V_{DC}$) is present at the accessory dimmer terminal AD of the main dimmer 502. Accordingly, the inverting input of the comparator U932 is pulled up to a voltage of approximately 5 V. Since the voltage at the inverting input of the comparator U932 is greater than the reference voltage $V_{REF}$ at the non-inverting input, the output of the comparator is driven low to circuit common (i.e., approximately zero volts). When either the main dimmer 502 or one of the remote dimmer 504 shorts out the AD line 509, the voltage at the non-inverting input of the comparator U932 is pulled down below the reference voltage $V_{REF}$, e.g., to approximately 2.2 V, such that the output of the comparator is pulled up to approximately the DC voltage $V_{CC4}$.

Figure 10:
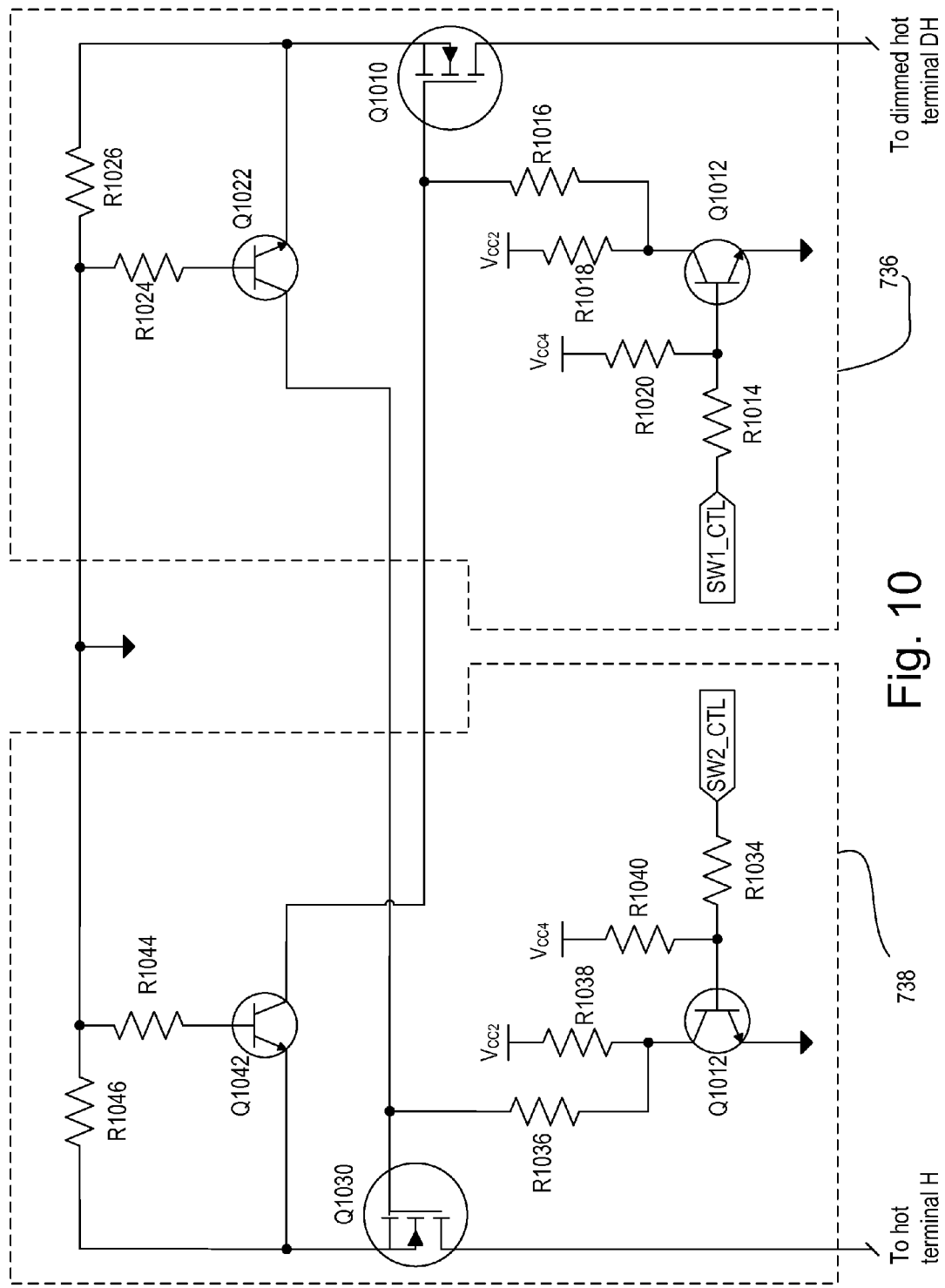
FIG. 10 is a simplified schematic diagram of switching circuits of the main dimmer of FIG. 7.

FIG. 10 is a simplified schematic diagram of the switching circuit 736, 738. The first switching circuit 736 is coupled between the dimmed-hot terminal DH and the non-isolated circuit common. The second switching circuit 738 is coupled between the hot terminal H and the non-isolated circuit common. During the positive half-cycles, the controller 714 controls the first switching circuit 736 to be conductive and non-conductive via the first control signal SW1_CTL. During the negative half-cycles, the controller 714 controls the second switching circuit 738 to be conductive and non-conductive via the second control signal SW2_CTL.

The first switching circuit 736 comprises a FET 1010, which conducts current from the non-isolated circuit common to the dimmed-hot terminal. For example, the FET 1010 is part number STN1NK60, manufactured by ST Microelectronics, and has a maximum voltage rating of 600V. The first control signal SW1_CTL is coupled to the base of an NPN bipolar transistor Q1012 via a resistor R1014 (e.g., having a resistance of 1 kΩ). The transistor Q1012 may be part number MBT3904DW, manufactured by On Semiconductor. When the first control signal SW1_CTL is low (i.e., at approximately zero volts), the transistor Q1012 is non-conductive, which allows the gate of the FET Q1010 to be pulled up to approximately the second non-isolated DC voltage $V_{CC2}$ via two resistors R1016, R1018, thus rendering the FET 1010 conductive. For example, the resistors R1014, R1016 may have resistances of 22 kΩ and 470 kΩ, respectively. When the first control signal SW1_CTL is high, the base of the transistor Q1012 is pulled up to approximately the fourth isolated DC voltage $V_{CC4}$ via a resistor R1020 (e.g., having a resistance of 100 kΩ). Accordingly, the transistor Q1012 is conductive and the gate of the FET 1010 is pulled low towards circuit common, thus rendering the FET 1010 non-conductive.

The second switching circuit 738 comprises a FET 1030, which is operable to conduct current from the non-isolated circuit common to the hot terminal. The second switching circuit 738 includes a similar driving circuit as the first switching circuit 736 for rendering the FET 1030 conductive and non-conductive.

When the FET 1010 of the first switching circuit 736 is conductive, the FET 1030 of the second switching circuit is rendered non-conductive. Specifically, the first switching circuit 736 includes an NPN bipolar transistor Q1022 having a base coupled to the non-isolated circuit common through resistor R1024 (e.g., having a resistance of 10 kΩ). When the FET 1010 is conducting current from the non-isolated circuit common to the dimmed-hot terminal DH, a voltage is produced across a resistor R1026, such that the transistor Q1022 is rendered conductive. Accordingly, the gate of the FET 1030 of the second switching circuit 738 is pulled away from the second non-isolated DC voltage $V_{CC2}$ to prevent the FET Q1030 from being conductive while the FET 1010 is conductive. Similarly, the second switching circuit 738 includes an NPN bipolar transistor Q1042, which causes the FET 1010 to be non-conductive when the FET 1030 is conducting and the appropriate voltage is produced across a resistor R1046.

Figure 11:
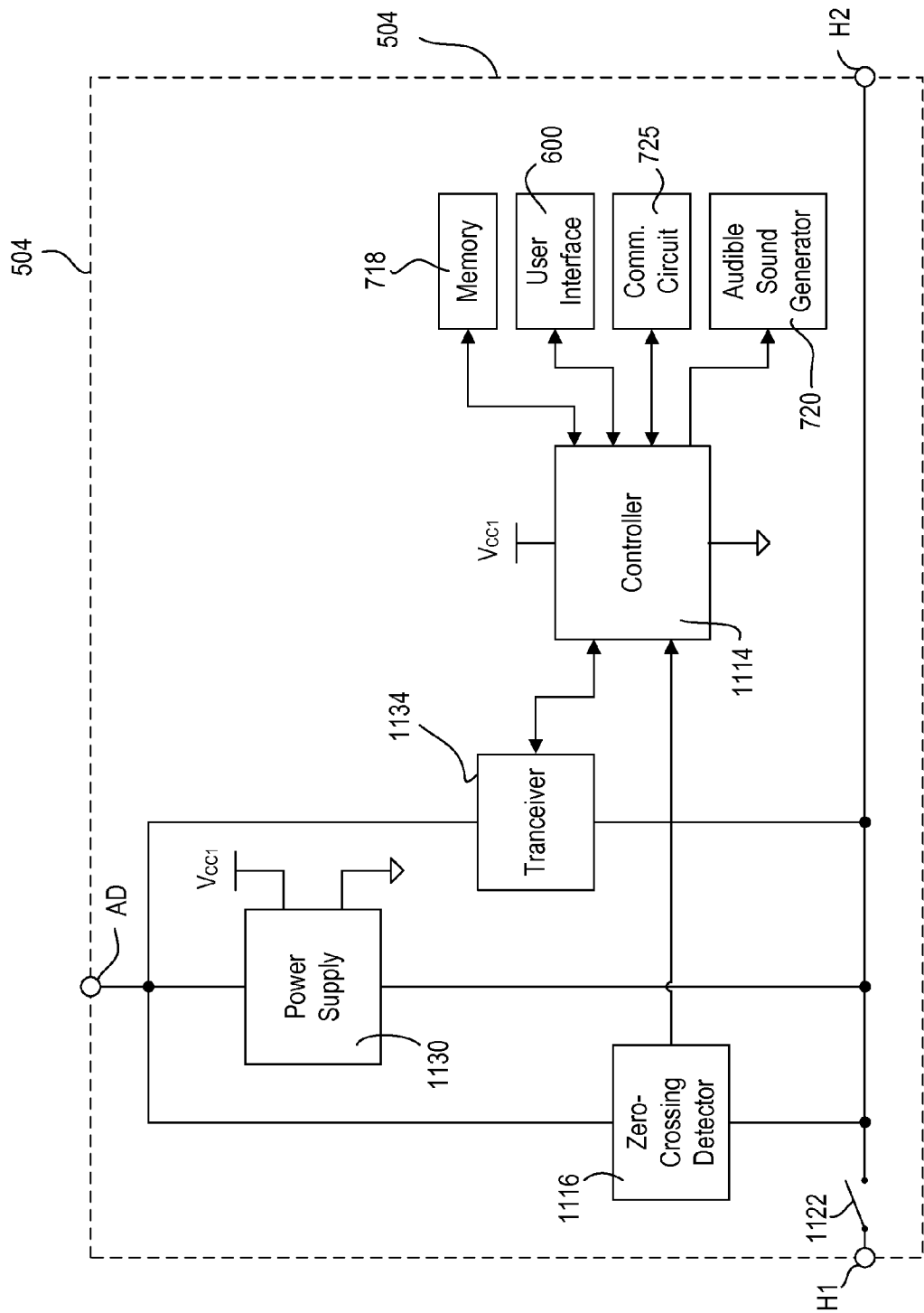
FIG. 11 is a simplified block diagram of the remote dimmers of the system of FIG. 5.

FIG. 11 is a simplified block diagram of one of the remote dimmers 504. The remote dimmer 504 includes many of the same functional blocks as the main dimmer 502. The remote dimmer 504 includes a controller 1114, but does not include any load control circuitry (i.e., the bidirectional semiconductor switch 710 and the gate drive circuit 712). The remote dimmer 504 comprises first and second hot terminals H1, H2 that are coupled in series with the bidirectional semiconductor switch 710 of the main dimmer 502, and are adapted to conduct the load current from the AC power source 506 to the lighting load 508.

A power supply 1130 is coupled between the accessory dimmer terminal AD and the second hot terminal H2 to draw power from the main dimmer 502 during the charging time period T$_{CHRG}$ of each half-cycle. The power supply 1130 only generates one isolated DC output voltage V$_{CC1}$ (e.g., 3.4 V$_{DC}$) for powering the controller 1114 and other low voltage circuitry of the remote dimmer 504.

A zero-crossing detector 1116 and a transceiver 1134 are coupled between the accessory dimmer terminal AD and the second hot terminal H2. The zero-crossing detector 1116 detects a zero-crossing when either of the first and second switching circuits 736, 738 change from non-conductive to conductive, thus coupling the AD supply voltage V$_{AD}$ across the zero-crossing detector. The controller 1114 begins timing at each zero-crossing and is then operable to transmit and receive digital messages via the transceiver 1134 after the charging time period T$_{CHRG}$ expires. The transceiver 1134 of the remote dimmer 504 is coupled in parallel with the transceiver 734 of the main dimmer 502 forming a communication path during the communication time period T$_{COMM}$ either in the positive or negative half-cycles depending on which side of the system 500 to which the remote dimmer is coupled. Accordingly, the communication path between the main dimmer 502 and the remote dimmers 504 does not pass through the AC power source 506 or the lighting load 508.

If the remote dimmers 504 are wired on both sides of the system 500 such that the first hot terminal H1 (which is coupled to the air-gap switch 1122) is positioned towards the AC power source 506 or the lighting load 508 (as shown in FIG. 5), the opening any of the air-gap switches 1122 of the remote dimmers 504 provides a true air-gap disconnect between the AC power source 506 and the lighting load 508. However, opening only the air-gap switch 722 of the main dimmer 502 does not provide a true air-gap disconnect between the AC power source 506 and the lighting load 508. When the air-gap switch 722 is open, the controller 714 does not power up and does not control either of the switching circuits 736, 738 to be conductive. When the air-gap switch 722 is opened and the controller 714 is not powered, the magnitude of the leakage current through the accessory dimmer terminal AD is limited (for example, to less than 0.5 mA) such that system 500 still meets the appropriate air-gap standards as set by, for example, the Underwriters Laboratories (UL). Specifically, the zero-crossing detectors 1116, the power supplies 1130, and the transceivers 1134 of the remote dimmers 504 include diodes coupled to the accessory dimmer terminal AD, such that the accessory dimmer terminals AD of the remote dimmers are only operable to conduct current into the remote dimmers. Thus, the only path for leakage current through the system 500 is through the dimmed hot terminal DH and out of the accessory dimmer terminal AD of the main dimmer 502 (i.e., through the first switching circuit 736, the power supply 730, and the current limit circuit 732). The components chosen for these circuits are such that the magnitude of the leakage current through the main dimmer 504 is limited to an appropriate level to meet the UL standard for leakage current when the air-gap switch 722 is opened.

The above-described scenario applies when the main dimmer 502 and the remote dimmers 504 are wired in the system 500 in any fashion. For example, the remote dimmers 504 may be wired to the line-side or the load-side of the system 500. Also, the system 500 may include more remote dimmers 504 than shown in FIG. 5. When any of the main dimmer 502 and the remote dimmers 504 are wired directly to the AC power source 506 and the lighting load 508, the respective air-gap switches 722, 1122 are positioned towards the AC power source and the lighting load, such that opening those air-gap switches provides an true air-gap disconnect between the AC power source 506 and the lighting load 508. However, if any of the main dimmer 502 and the remote dimmers 504 that are wired directly to the AC power source 506 and the lighting load 508 do not have their air-gap switches 722, 1122 positioned towards the AC power source and the lighting load, the leakage current through the main dimmer and the remote dimmers is limited to meet the UL standard for leakage current when an air-gap switch is opened as described above. The leakage current is further limited in this way when the air-gap switches 722, 1122 of any of the main dimmer 502 and the remote dimmers 504 that are wired in the middle of the system 500 are opened.

Figure 12:
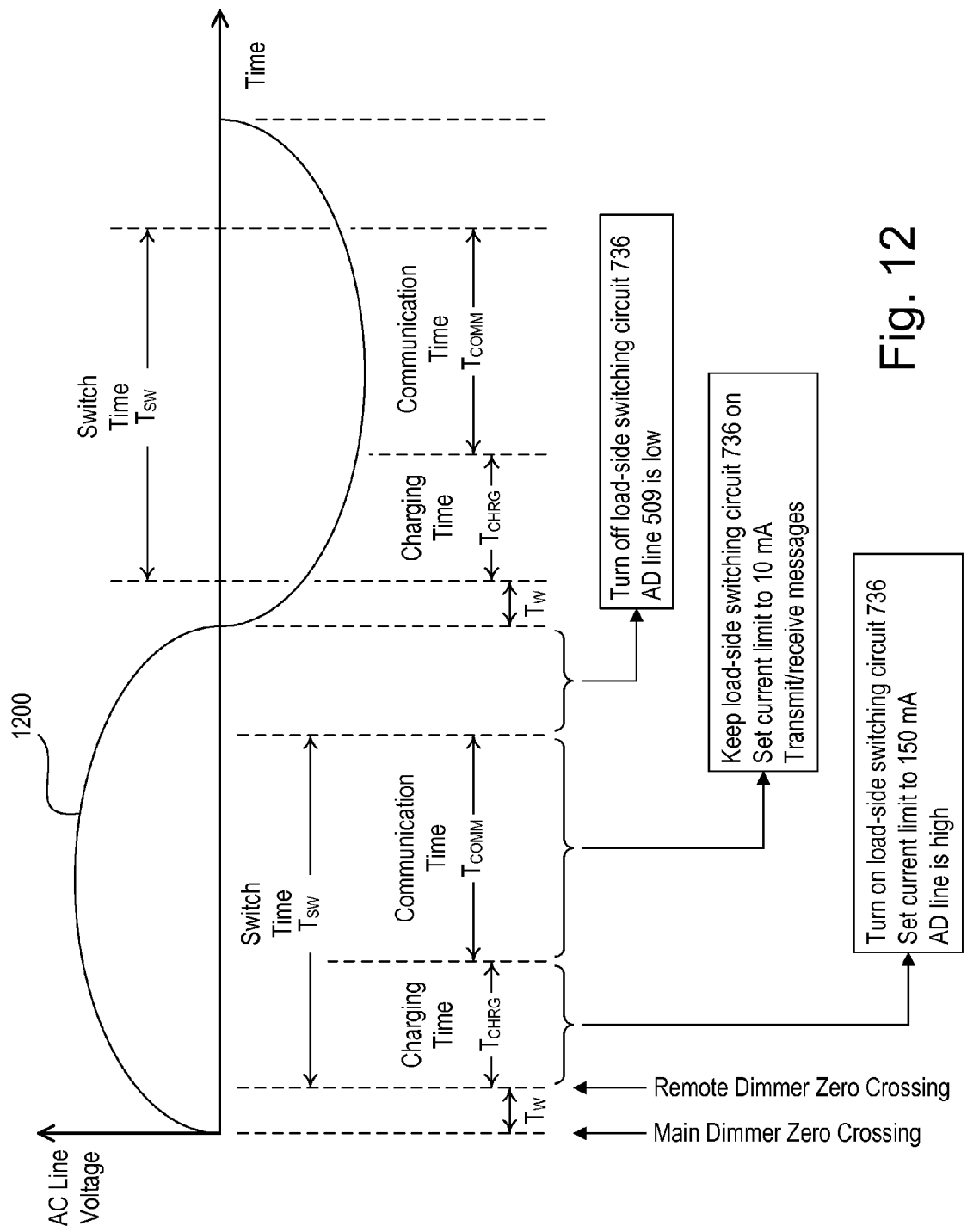
FIG. 12 is a timing diagram of a complete line cycle of an AC voltage waveform detailing the operation of the system of FIG. 5.

FIG. 12 is a simplified timing diagram of a complete line cycle of an AC voltage waveform 1200 provided by the AC power source 506. The timing diagram illustrates the operation of the main dimmer 502 during each half-cycle of the AC voltage waveform 1200. The main dimmer 502 is operable to allow the remote dimmers 504 to charge their internal power supplies 1130 during the charging time period T$_{CHRG}$ each half-cycle. The main dimmer 502 and the remote dimmers 504 are operable to transmit and receive digital messages on the AD line 509 during the communication time period T$_{COMM}$ each half-cycle. The controller 714 of the main dimmer 502 enables the first switching circuit 736 and the second switch circuit 738 during a switch time period T$_{SW}$, which is equal to the charging time period T$_{CHRG}$ plus the communication time period T$_{COMM}$.

Figure 13A:
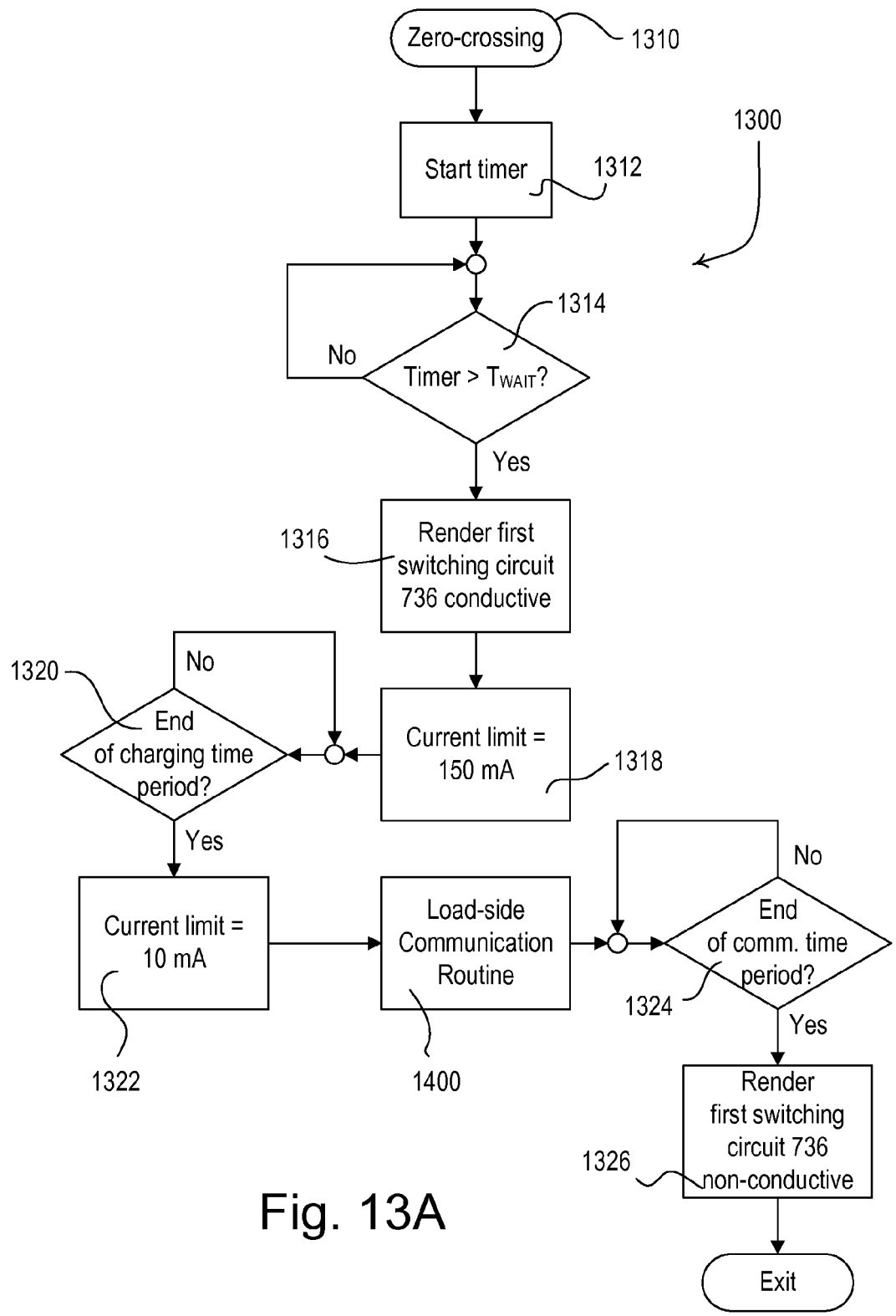
FIGS. 13A and 13B are simplified flowcharts of a load-side multi-location control procedure and a line-side multi-location control procedure, respectively, executed by a controller of the main dimmer of FIG. 7.
Figure 13B:
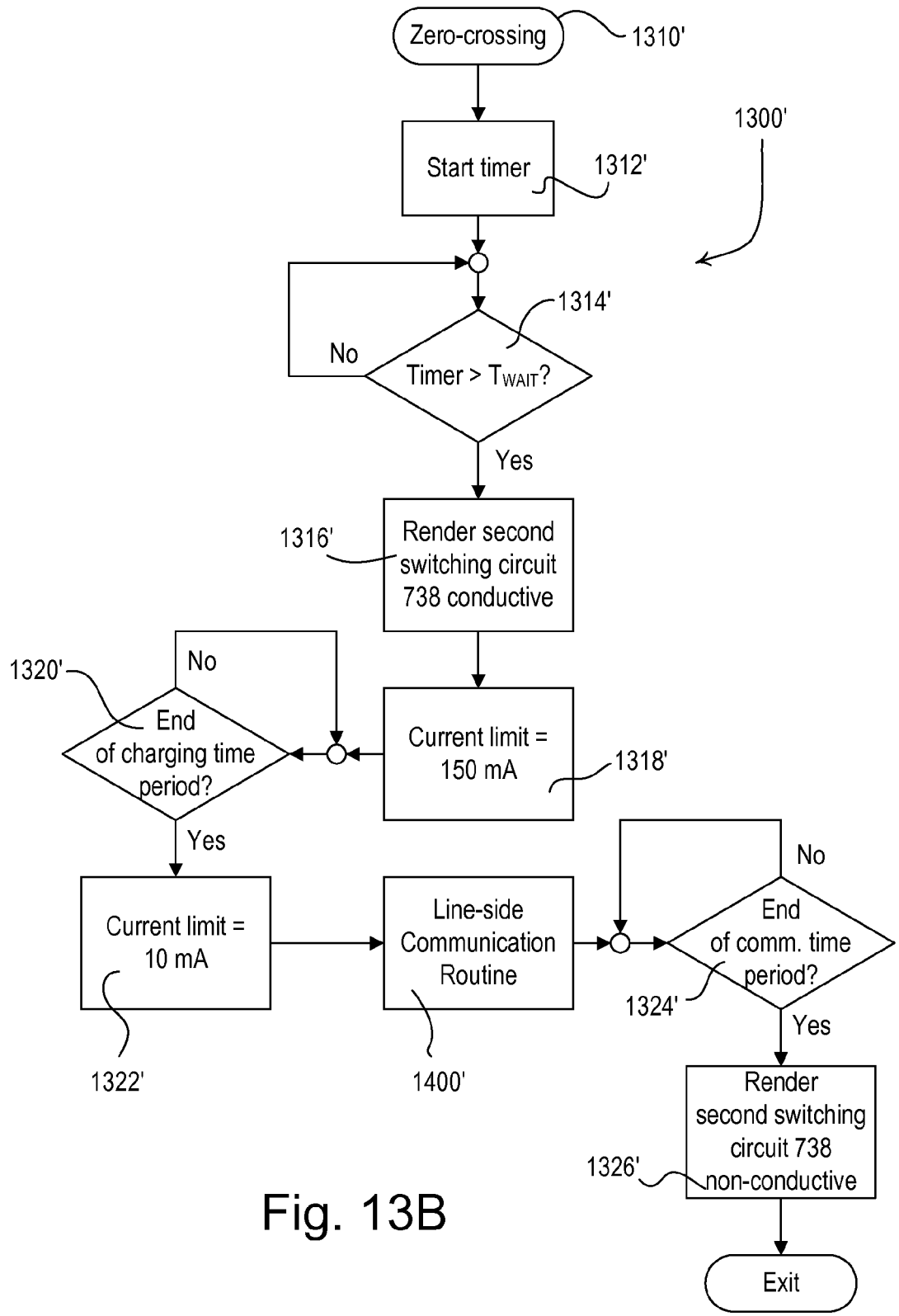

FIG. 13A is a simplified flowchart of a load-side multi-location control procedure 1300 executed by the controller 714 of the main dimmer 502 the positive half-cycles of the AC power source 506. FIG. 13B is a simplified flowchart of a line-side multi-location control procedure 1300' executed by the controller 714 of the main dimmer 502 the negative half-cycles of the AC power source 506. The load-side multi-location control procedure 1300 begins at the beginning of each positive half-cycle when the zero-crossing detector 718 of the main dimmer 502 signals a positive-going zero-crossing to the controller 714 at step 1310. At step 1312, the controller 714 starts a timer, which is used to determine when the charging time period T$_{CHRG}$ and the communication time period T$_{COMM}$ begin and end. The controller 714 then waits at step 1314 for a wait time period T$_w$ (e.g., approximately 10% of a positive half-cycle or 833 μsec).

At step 1316, the controller 714 renders the load-side switching circuit (i.e., the first switching circuit 736) conductive by driving the first control signal SW1_CTL low at the beginning of the charging time period T$_{CHRG}$. The controller 714 then controls the current limit circuit 732 to have a current limit of 150 mA at step 1318 by driving the control signal I_LIMIT low. Accordingly, the second DC output voltage V$_{CC2}$ (i.e., the AD supply voltage V$_{AD}$) is provided to the remote dimmers 504 on the load side of the system 500, and the power supplies 1130 of the remote dimmer 504 charge during the charging time period $T_{CHRG}$. The zero-crossing detector 1116 of each of the load-side remote dimmers 504 detects a zero-crossing at the beginning of the charging time period $T_{CHRG}$. For example, the charging time period $T_{CHRG}$ lasts approximately 2 msec.

After the charging time period $T_{CHRG}$ at step 1320, the controller 714 controls the current limit of the current limit circuit 732 to approximately 10 mA at step 1322 at the beginning of the communication time period $T_{COMM}$. The first switching circuit 736 is maintained conductive during the communication time period $T_{COMM}$, such that the AD line 509 remains at the AD supply voltage $V_{AD}$ (i.e., 80 volts with respect to the dimmed hot terminal DH) if the main dimmer 502 and the remote dimmers 504 are not presently communicating on the AD line 509.

The main dimmer 502 and the remote dimmers 504 are operable to transmit and receive digital messages during the communication time period $T_{COMM}$. Specifically, the controller 714 executes a load-side communication routine 1400, which will be described in greater detail with reference to FIG. 14A. The main dimmer 502 and the remote dimmers 504 may encode the transmitted digital messages using Manchester encoding. However, other encoding techniques that are well known to those of ordinary skill in the art could be used. With Manchester encoding, the bits of the digital messages (i.e., either a logic zero value or a logic one value) are encoded in the transitions (i.e., the edges) of the signal on the communication link. When no messages are being transmitted on the AD line 509, the AD line floats high in an idle state. To transmit a logic zero value, the transceiver 734 is operable to "short" the AD line 509 to the dimmed hot terminal DH to cause the AD line to change from the idle state (i.e., 80 $V_{DC}$) to a shorted state (i.e., a "high-to-low" transition). Conversely, to transmit a logic one value, the transceiver 734 is operable to cause the AD line to transition from the shorted state to the idle state (i.e., a "low-to-high" transition). The controller 714 renders the FET Q912 conductive to short the AD line 509 to the dimmed hot terminal DH when the first switching circuit 736 is conductive during the positive half-cycles.

For example, the communication time period $T_{COMM}$ may last for approximately 3.75 msec. Five (5) bits of a transmitted message may be transmitted during the communication time period $T_{COMM}$ of each half-cycle. At the end of the communication time period $T_{COMM}$ at step 1324, the first switching circuit 736 is rendered non-conductive at step 1326, such that the power supply 730 and the transceiver 734 of the main dimmer 504 are no longer coupled between the accessory dimmer terminal AD and the dimmed hot terminal DH.

During the negative half-cycles, a similar timing cycle occurs. Referring to FIG. 13B, the line-side multi-location control procedure 1300' begins at the beginning of each negative half-cycle when the zero-crossing detector 718 of the main dimmer 502 signals a negative-going zero-crossing to the controller 714 at step 1310'. The controller 714 of the main dimmer 502 renders the line-side switching circuit (i.e., the second switching circuit 738) conductive at step 1316', such that the second DC output voltage $V_{CC2}$ is provided to the remote dimmers 504 on the line side of the system 500. Accordingly, the remote dimmers 504 on the line side are operable to charge their power supplies 1130 from the AD supply voltage $V_{AD}$ during the charging time period $T_{CHRG}$, and to transmit and receive digital messages during the communication time period $T_{COMM}$ using a line-side communication routine 1400'. The controller 714 renders the FET Q912 conductive to short the AD line 509 to the hot terminal H when the second switching circuit 738 is conductive during the negative half-cycles. At the end of the communication time period $T_{COMM}$ at step 1324', the controller 714 renders the second switching circuit 738 conductive at step 1326'.

The digital messages transmitted between the main dimmer 502 and the remote dimmers 504 comprise, for example, four fields: a 3-bit synchronization (start) symbol, a 5-bit message description, a 7-bit message data section, and a 10-bit checksum. The synchronization (start) symbol serves to synchronize the transmission across the series of line cycles required to communicate an entire packet. Typically, the message description comprises a "light level" command or a "delay off" command. The 7-bit message data section of each digital message comprises specific data in regards to the message description of the present message. For example, the message data may comprise the actual light level information if the message description is a light level command. Up to 128 different light levels may be communicated between the main dimmer 502 and the remote dimmers 504.

Since only five bits are transmitted each half-cycle, the controller 714 uses multiple buffers to hold the digital message to be transmitted and received. Specifically, the controller 714 of the main dimmer 502 uses a load-side TX buffer and a line-side TX buffer for digital message to transmit during the positive half-cycles and negative half-cycles, respectively. Further, the controller 714 of the main dimmer 502 also uses a load-side RX buffer and a line-side RX buffer for digital messages received during the positive and negative half-cycles, respectively.

Accordingly, the main dimmers 502 and the remote dimmers 504 are operable to transmit light level information to each other in response to actuations of the touch sensitive actuator 150. The main dimmers 502 and remote dimmer 504 are then all operable to illuminate the LEDs behind the actuation member 612 to the same level to indicate the intensity of the lighting load 508.

When the system 500 is wired with the main dimmer 504 in a location other than the line side or the load side of the system, the digital message transmitted across the AD line 509 cannot pass from load side of the system to the line side of the system (and vice versa) due to the bidirectional semiconductor switch 710. Accordingly, if a user touches the actuator 610 of a remote dimmer 504 on the load side of the main dimmer 502, a remote dimmer 504 on the line side would not receive the message. To provide full system capability, the main dimmer 502 has an additional responsibility of relaying messages from one side of the system to the other. In the immediately following half-cycle, the main dimmer 502 broadcasts to the opposite side of the system 500 any communication signals that are received in the previous half-cycle.

Figure 14A:
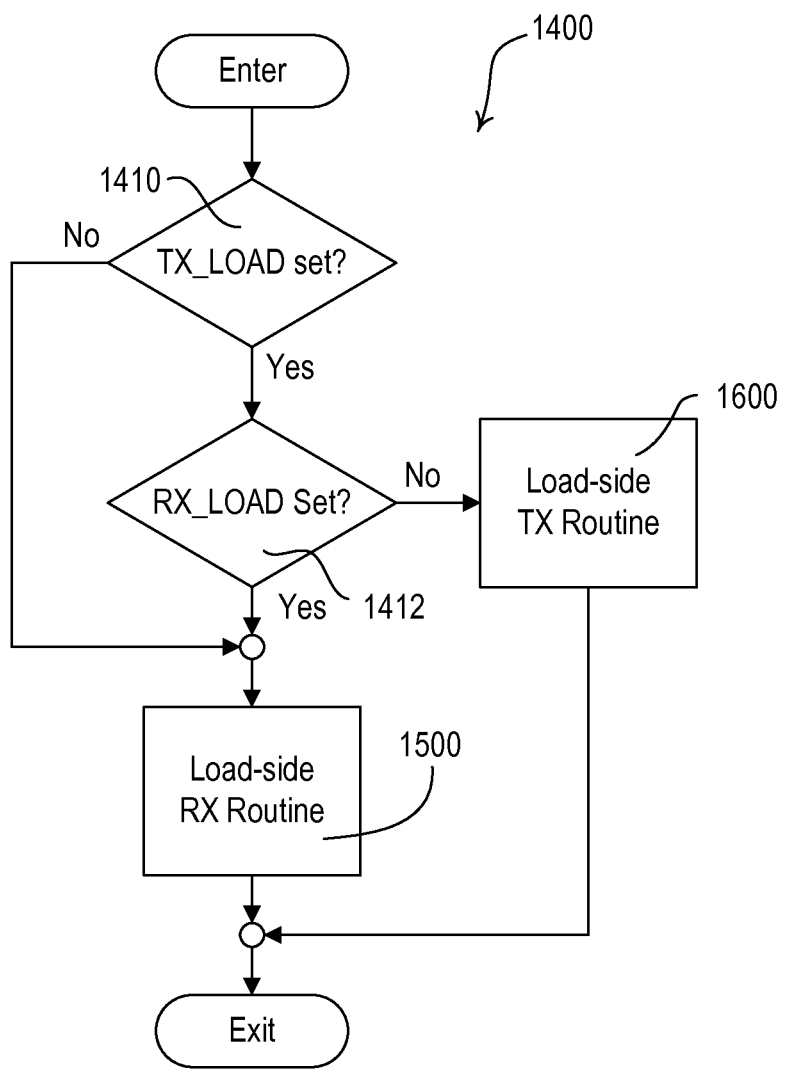
FIGS. 14A and 14B are simplified flowcharts of a load-side communication routine and a line-side communication routine, respectively, executed during the load-side and line-side multi-location control procedures of FIGS. 13A and 13B.
Figure 14B:
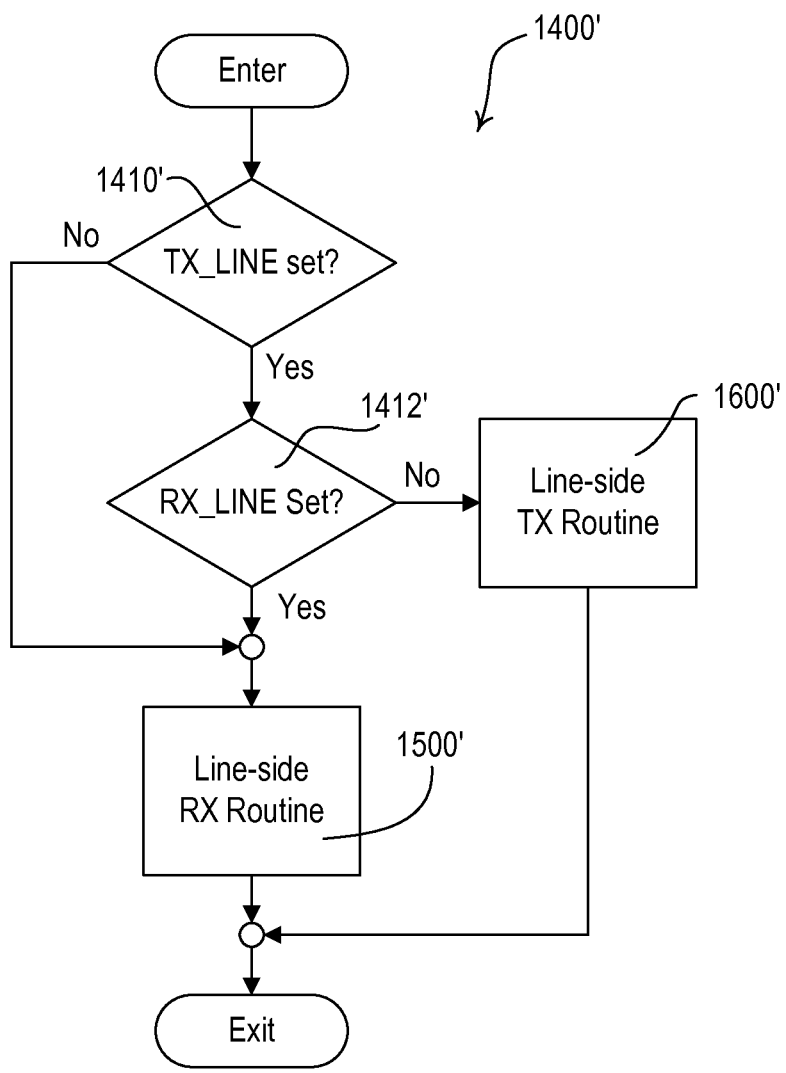

FIG. 14A is a simplified flowchart of the load-side communication routine 1400 executed by the controller 714 of the main dimmer 502 during the load-side multi-location control procedure 1300. FIG. 14B is a simplified flowchart of the line-side communication routine 1400' executed by the controller 714 of the main dimmer 502 during the line-side multi-location control procedure 1300'. The controller 714 uses two flags RX_LOAD and RX_LINE to keep track of whether the controller is presently receiving a digital message during the positive and negative half-cycles, respectively. The controller 714 also uses two flags TX_LOAD and TX_LINE to keep track of whether the controller is presently transmitting a digital message during the positive and negative half-cycles, respectively.

Referring to FIG. 14A, after calling the load-side communication routine 1400, the controller 714 first determines at step 1410 as to whether the flag TX_LOAD is set, i.e., the main dimmer 502 is presently in the middle of transmitting a digital message to the remote dimmers 504 on the load side of the system 500. If not, the controller 714 executes a load-side RX routine 1500, which will be described in greater detail below with reference to FIG. 15A. If the flag TX_LOAD is set at step 1410, but the flag RX_LOAD is set (i.e., the main dimmer 502 is presently receiving a digital message to the dimmers 504 on the load side of the system 500) at step 1412, the controller 714 also executes the load-side RX routine 1500. Otherwise, the controller 714 executes a load-side TX routine 1600, which will be described in greater detail below with reference to FIG. 16A.

Figure 15A:
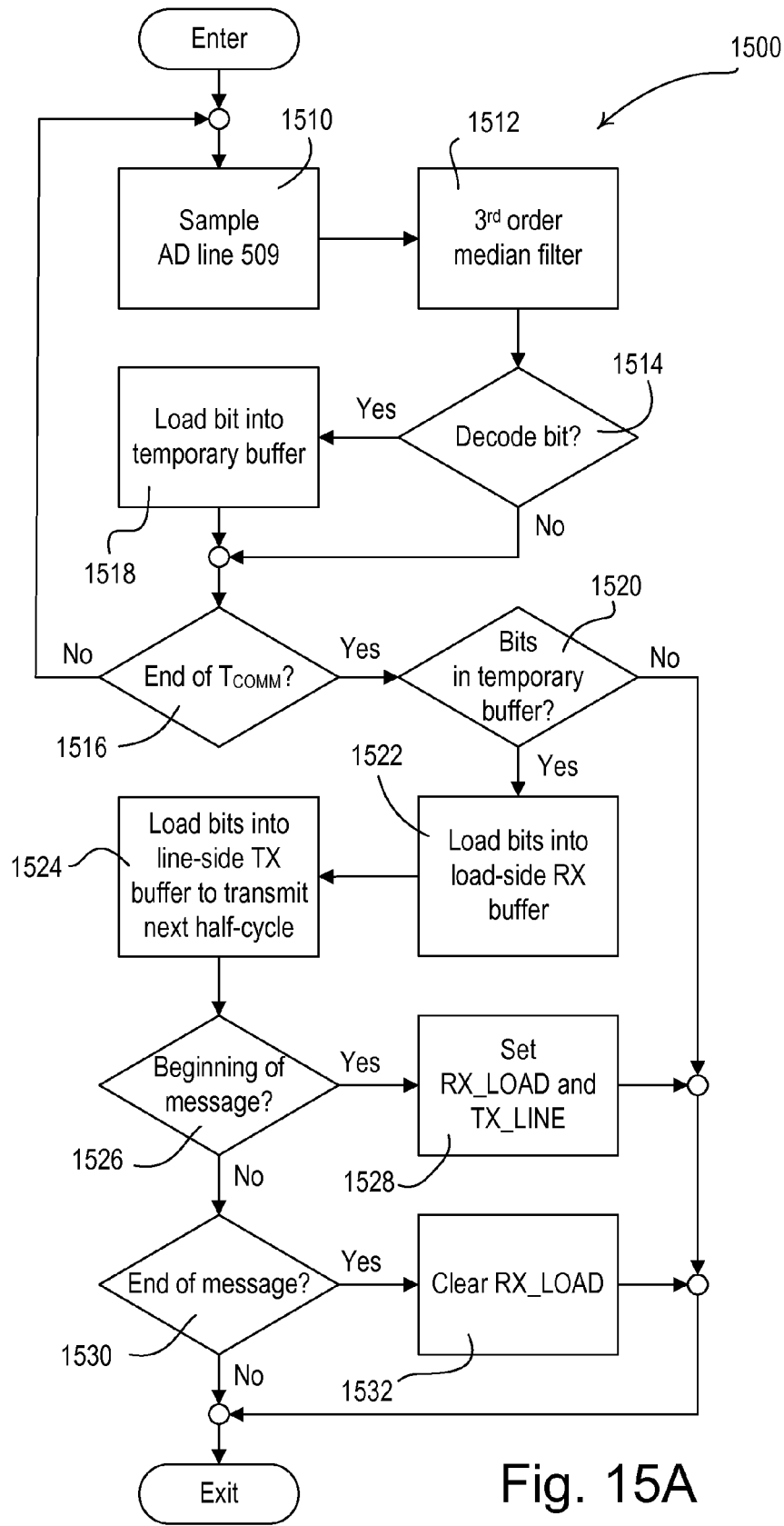
FIGS. 15A and 15B are simplified flowcharts of a load-side RX routine and a line-side RX routine, respectively, executed during the load-side and line-side communication routines of FIGS. 14A and 14B.

FIG. 15A is a simplified flowchart of the load-side RX routine 1500. The controller 714 first determines the next bit of the received digital message by sampling the AD line 509 at step 1510. The controller 714 samples the AD line 509 periodically, e.g., approximately every 75 μsec. The controller 714 uses a $3^{rd}$-order median filter 1512 to filter noise from the bits of the received digital messages. A median filter is described in greater detail in co-pending commonly-assigned U.S. patent application Ser. No. 11/644,652, filed Dec. 22, 2006, entitled METHOD OF COMMUNICATING BETWEEN CONTROL DEVICES OF A LOAD CONTROL SYSTEM, the entire disclosure of which is hereby incorporated by reference. If the controller 714 has not collected enough samples at step 1510 to decode the next bit of the received digital message at step 1514, a determination is made as to whether the end of the communication time period $T_{COMM}$ has arrived at step 1516. If not, the controller 714 samples the AD line 509 again at step 1510 at the next sampling time (i.e., 75 μsec after the last sample). When the controller 714 decodes the next bit at step 1514 (i.e., determines a low-to-high transition or a high-to-low transition in accordance with Manchester encoding), the controller loads the new logical bit (i.e., a logic high or a logic low) into a temporary buffer at step 1518, and then samples the AD line 509 again at step 1510 if the end of the communication time period $T_{COMM}$ has not arrived at step 1516.

At the end of the communication time period $T_{COMM}$ at step 1516, the controller 714 determines if there are any decoded bits in the temporary buffer at step 1520. If there are not any decoded bits in the temporary buffer at step 1520 (i.e., the main dimmer 502 is not presently receiving a digital message from the dimmers 504 on the load side of the system 500), the load-side RX routine 1500 simply exits. If there are decoded bits in the temporary buffer at step 1520, the controller loads the decoded bits into the load-side RX buffer at step 1522. The controller 714 also loads the new decoded bits into the front of the line-side TX buffer at step 1524, such that the controller will re-transmit the received bit to the remote dimmers 504 on the line-side of the system 500 during the next half-cycle.

If the controller 714 has received the beginning of a new message at step 1526 (i.e., the main dimmer has received the 3-bit synchronization symbol of a digital message), the controller 714 sets at step 1528 the flag RX_LOAD (since the main dimmer 502 is presently receiving a digital message in the positive half-cycles) and the flag TX_LINE (since the main dimmer 502 will re-transmit the bits of the digital message received from the remote dimmers 504 on the load-side of the system 500 to the remote dimmers on the line-side of the system). If the controller 714 has received and loaded an entire message into the load-side RX buffer at step 1530, the controller clears the flag RX_LOAD at step 1532 and the routine 1500 exits.

Figure 16A:
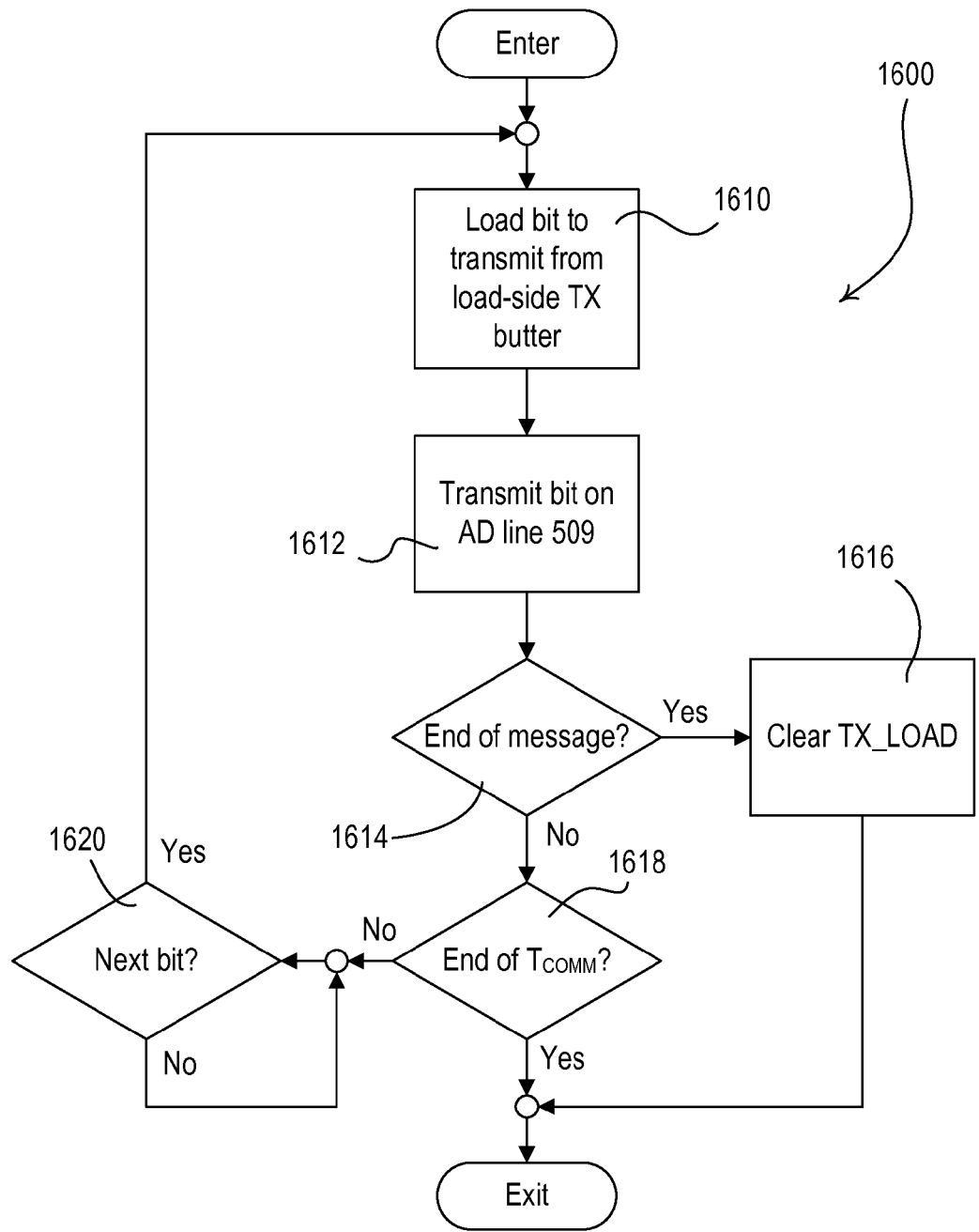
FIGS. 16A and 16B are simplified flowcharts of a load-side TX routine and a line-side TX routine, respectively, executed during the load-side and line-side communication routines of FIGS. 14A and 14B.

FIG. 16A is a simplified flowchart of the load-side TX routine 1600. The controller 714 first determines the next bit to transmit on the AD line 509 from the load-side TX buffer at step 1610. At step 1612, the controller 714 transmits the bit according to Manchester encoding, by either controlling the AD line 509 through either a low-to-high or a high-to-low transition. If the controller 714 has transmitted all of the bits for the entire digital message at step 1614, the controller 714 clears the flag TX_LOAD at step 1616 and the routine 1600 exits. If the controller 714 has not reached the end of the digital message being transmitted at step 1614, and has not reached the end of the communication time period $T_{COMM}$ at step 1618, the routine 1600 loops around to transmit another bit at steps 1612. At the end of the communication time period $T_{COMM}$ at step 1618, the routine 1600 simply exits.

Figure 15B:
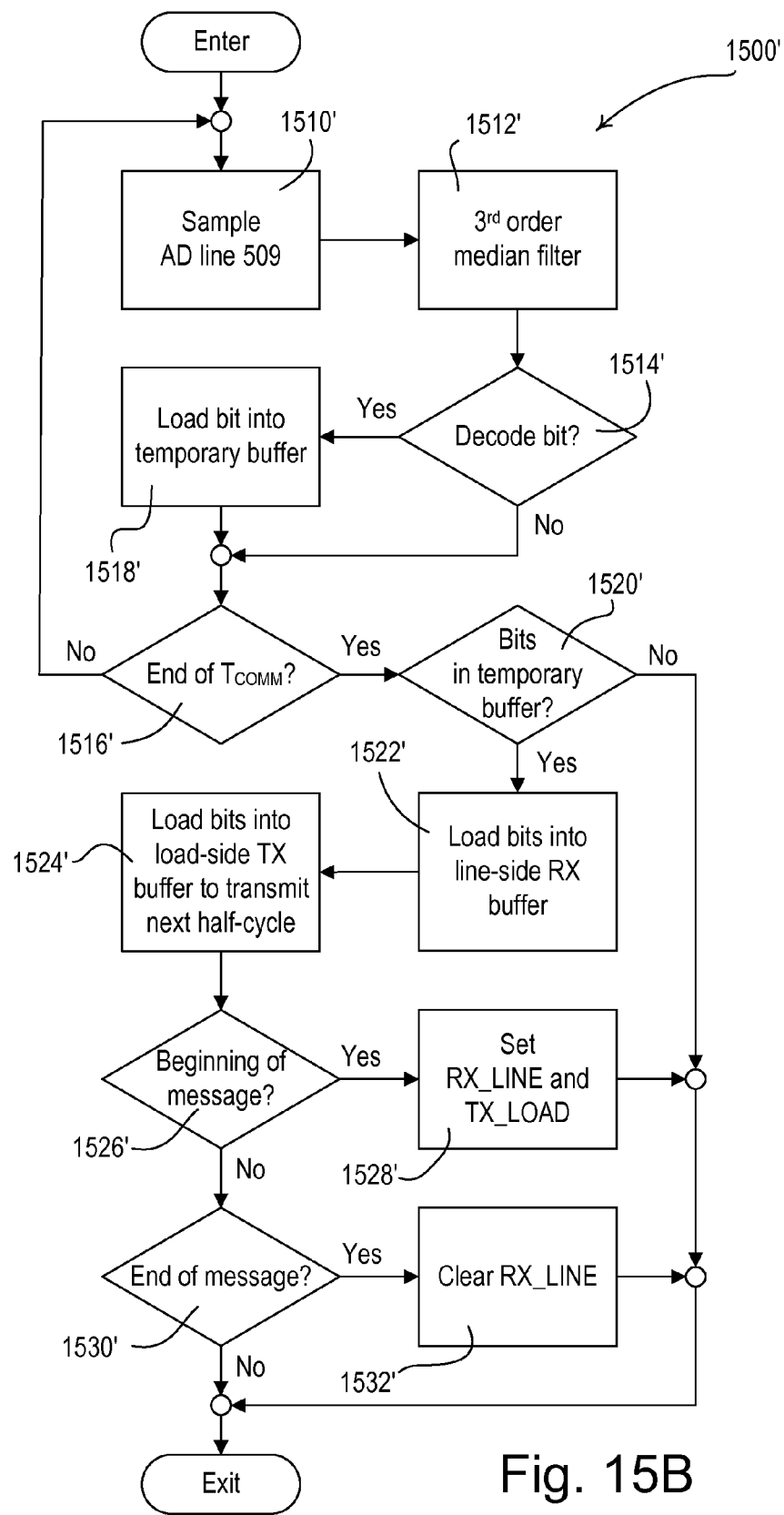
Figure 16B:
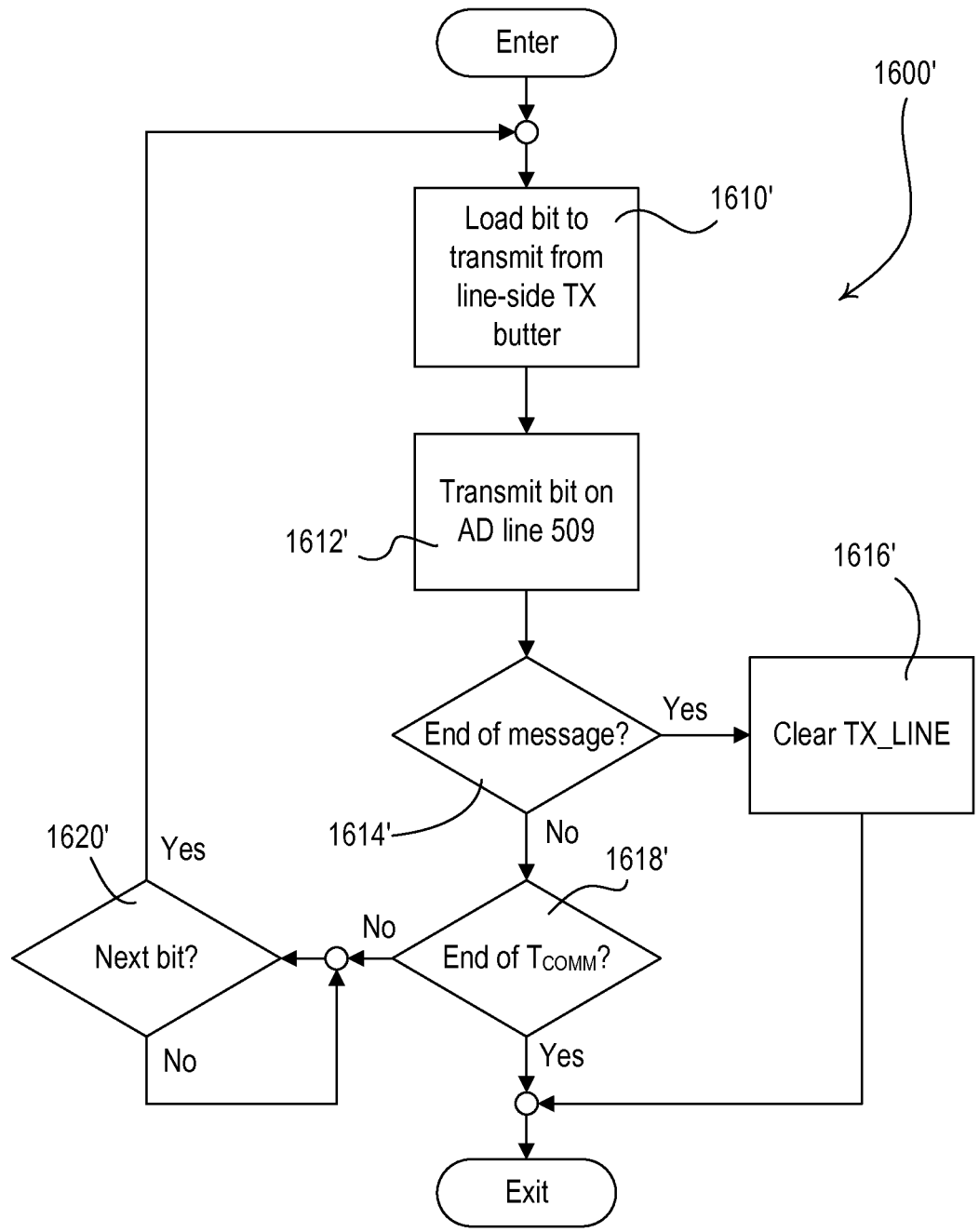

The line-side communication routine 1400' of FIG. 14B, which is very similar to the load-side communication routine 1400, and is executed by the controller 714 during communication time period $T_{COMM}$ of the negative half-cycles, and calls a line-side RX routine 1500' shown in FIG. 15B and a line-side TX routine 1600' shown in FIG. 16B. The line-side RX routine 1500' and a line-side TX routine 1600' are similar to the load-side RX routine 1500 and a line-side TX routine 1600, respectively. However, during the line-side RX routine 1500', the controller 714 loads the decoded bit into the line-side RX buffer at step 1522' and into the load-side TX buffer at step 1524'. Further, during the line-side TX routine 1600', the controllers 714 loads the next bit to transmit from the line-side TX buffer at step 1610'.

Figure 17:
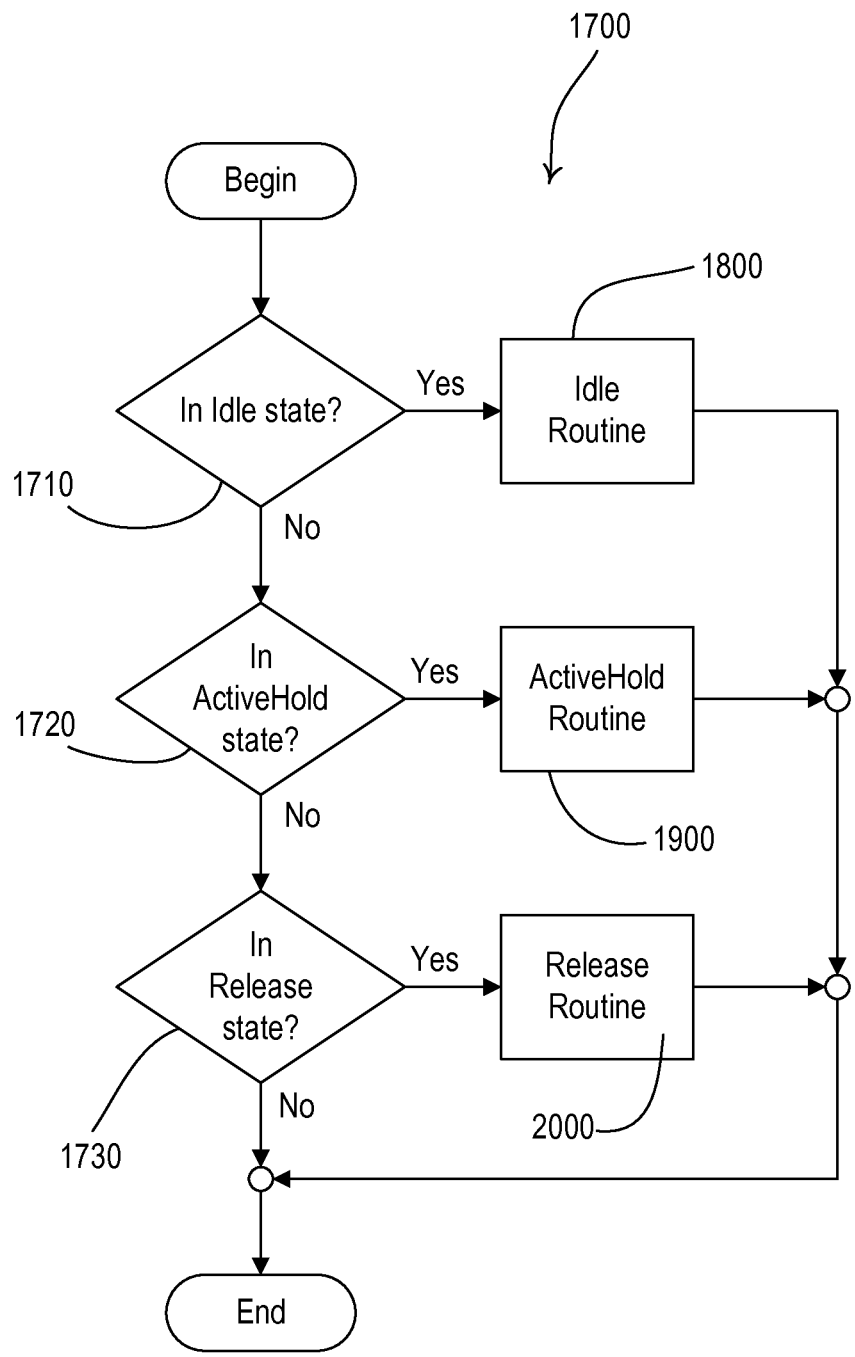
FIG. 17 is a simplified flowchart of a user interface procedure executed by the controller of the main dimmer of FIG. 7.

FIG. 17 is a simplified flowchart of a user interface procedure 1700 executed periodically by the controller 714 of the main dimmer 502, e.g., once every 10 msec. The user interface procedure 1700 selectively executes one of three routines depending upon the state of the main dimmer 502. If the main dimmer 502 is in an "Idle" state (i.e., the user is not actuating the touch sensitive actuator 610) at step 1710, the controller 714 executes an Idle routine 1800. If the main dimmer 502 is in an "ActiveHold" state (i.e., the user is presently actuating the touch sensitive actuator 610) at step 1720, the controller 714 executes an ActiveHold routine 1900. If the main dimmer 502 is in a "Release" state (i.e., the user has recently ceased actuating the touch sensitive actuator 610) at step 1730, the controller 714 executes a Release routine 2000.

Figure 18:
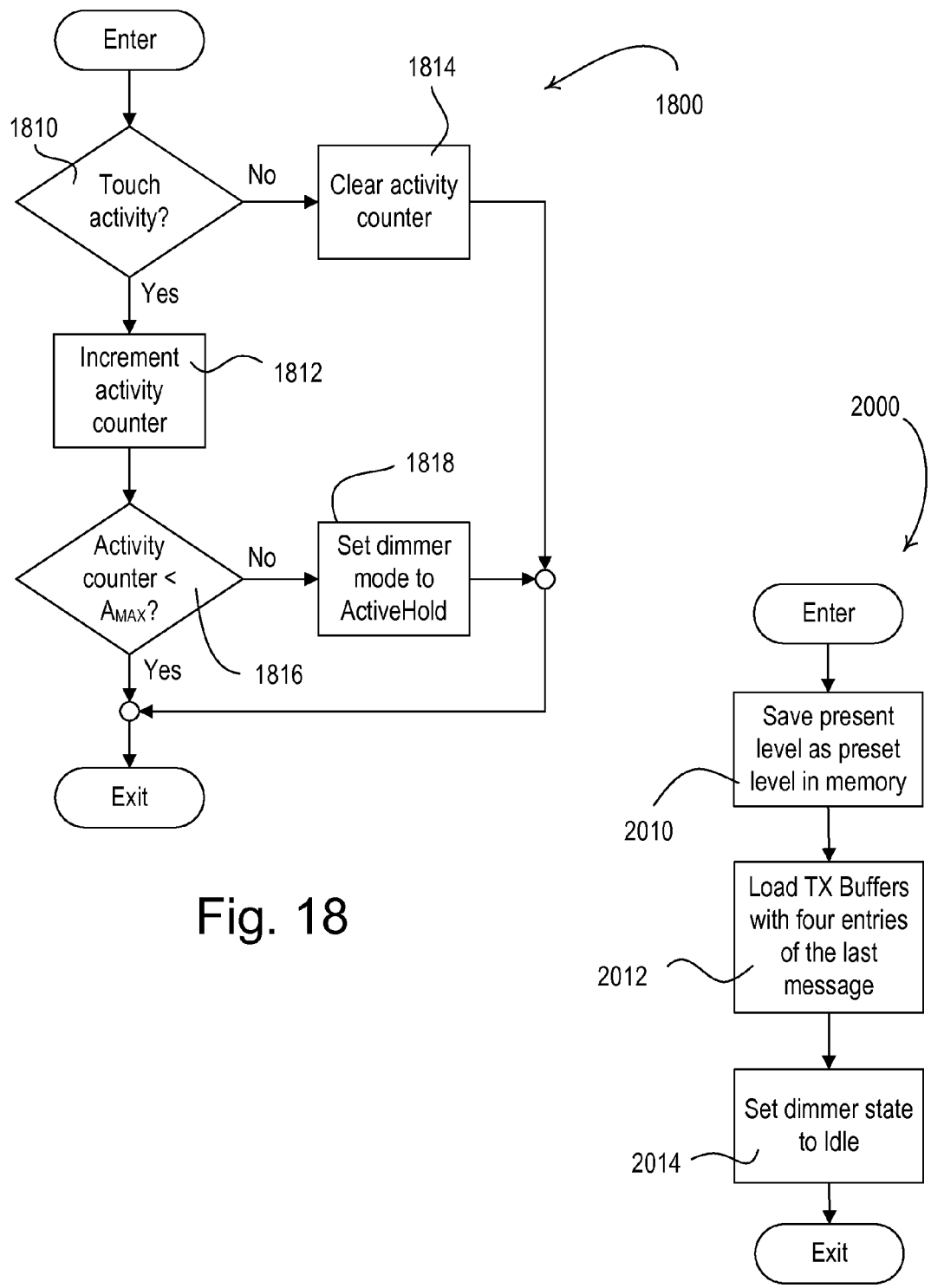
FIG. 18 is a simplified flowchart of an Idle routine of the user interface procedure of FIG. 17.

FIG. 18 is a simplified flowchart of the Idle routine 1800, which executed periodically when the main dimmer 502 is in the Idle state. The controller 714 changes the state of the main dimmer 502 to the ActiveHold state when the user actuates the touch sensitive actuator 610. Specifically, if there is activity on the touch sensitive actuator 610 of the main dimmer 502 at step 1810, an activity counter is incremented at step 1812. Otherwise, the activity counter is cleared at step 1814. The activity counter is used by the controller 714 to ensure that the main dimmer 502 changes to the ActiveHold state only in response to an actuation of the touch sensitive actuator 610 and not as a result of noise or some other undesired impulse. The use of the activity counter is similar to a software "debouncing" procedure for a mechanical switch, which is well known to one having ordinary skill in the art. If the activity counter is not less than a maximum activity counter value $A_{MAX}$ at step 1816, then the state of the main dimmer 502 is set to the ActiveHold state at step 1818. Otherwise, the Idle routine 1800 simply exits.

Figure 19:
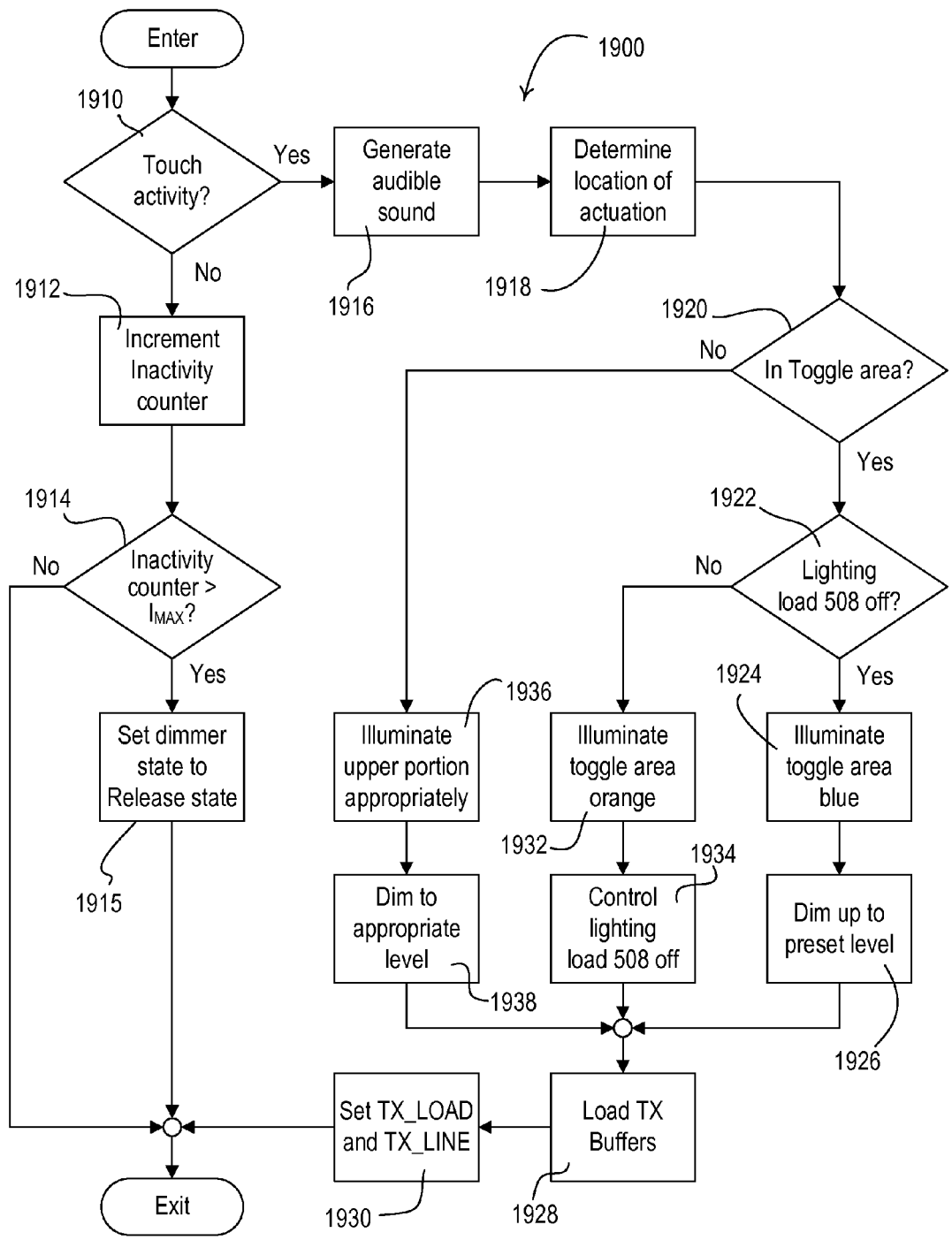
FIG. 19 is a simplified flowchart of an ActiveHold routine of the user interface procedure of FIG. 17.

FIG. 19 is a simplified flowchart of the ActiveHold routine 1900, which is executed once every half-cycle when the touch sensitive actuator 610 is being actuated, i.e., when the main dimmer 502 is in the ActiveHold state. First, a determination is made as to whether the user has stopped using, i.e., released, the touch sensitive actuator 610. If there is no activity on the touch sensitive actuator 610 at step 1910, the controller 714 increments an "inactivity counter" at step 1912. The controller 714 uses the inactivity counter to make sure that the user is not still actuating the touch sensitive actuator 610 before entering the Release mode. If the inactivity counter is less than a maximum inactivity counter value $I_{MAX}$ at step 1914, the ActiveHold routine 1900 simply exits. Otherwise, the state of the main dimmer 502 is set to the Release state at step 1915, and then the routine 1900 exits.

If there is activity on the touch sensitive actuator 610 at step 1910, the controller 714 generates an audible sound at step 1916 using the audible sound generator 718. Generation of the audible sound is described in greater detail in co-pending commonly-assigned U.S. patent application Ser. No. 11/472,245, filed Jun. 20, 2006, entitled TOUCH SCREEN WITH SENSORY FEEDBACK, the entire disclosure of which is hereby incorporated by reference. Next, the controller 714 determines where along the length of the actuation member 612 that the touch sensitive actuator is being actuated at step 1918. If the touch sensitive actuator 610 is being actuated in the toggle area, i.e., the lower portion 612B of the actuation member 612, at step 1920, the controller 714 processes the actuation of the touch sensitive actuator as a toggle. If the lighting load 508 is presently off at step 1922, the controller 714 turns the lighting load on. Specifically, the controller 714 illuminates the lower portion 612B of the actuation member 612 blue at step 1924 and dims the lighting load 508 up to the preset level, i.e., the desired lighting intensity of the lighting load, at step 1926. Further, the controller 714 loads a digital message into the load-side and line-side TX buffers at step 1928. The message description of the digital message comprises, for example, a light level command and the message data comprises the preset level. Finally, the controller 714 sets both the flags TX_LOAD and TX_LINE at step 1930 (since the main dimmer 502 will transmit the digital message to the remote dimmers 504 on both sides of the system 500), and the routine 1900 exits.

If the lighting load is presently on at step 1922, the controller 714 illuminates the lower portion 612B of the actuation member 612 orange at step 1932 and controls the lighting load 508 to off at step 1934. At step 1928, the controller 714 loads a digital message into the load-side and line-side TX buffers, where the message description is a light level command and the message data comprises zero percent (or off). Finally, the controller 714 sets both the flags TX_LOAD and TX_LINE at step 1930, and the routine 1900 exits.

If the touch sensitive actuator 610 is not being actuated in the toggle area at step 1920, the upper portion 612A is being actuated and the location of the actuation on the touch sensitive actuator 610 is representative of the desired intensity level of the lighting load 508. At step 1936, the controller 714 illuminates the upper portion 612A of the actuation member 612 appropriately, i.e., as a bar graph representative of the present intensity of the lighting load 508. The controller 714 dims the lighting load 508 to the appropriate level as determined from the location of the actuation of the touch sensitive actuator 610 at step 1938. At step 1928, the controller 714 loads the load-side and line-side TX buffers with a digital message having a light level command as the message description and the present intensity level as the message data. Finally, the controller 714 sets both the flags TX_LOAD and TX_LINE at step 1930, and the routine 1900 exits.

FIG. 20 is a flowchart of the Release routine 2000, which is executed after the controller 714 sets the state of the dimmer state to the Release state at step 1915 of the ActiveHold routine 1900. First, the controller 714 stores the present intensity level of the lighting load 508 in the memory 718 at step 2010. At step 2012, the controller 714 stores four entries of the last digital message to be transmitted in response to the actuation of the touch sensitive actuator 610 into the load-side and line-side TX buffers, such that the main dimmer 502 sends four additional identical digital messages to the remote dimmers 504 to ensure that the remote dimmers received the digital message. Finally, the controller 714 sets the state of the main dimmer 502 to the Idle state at step 2014, and the Release routine 2000 exits.

The message description of the digital messages transmitted between the main dimmer 502 and the remote dimmers 504 may also comprise an advanced programming mode (APM) command, i.e., a command to adjust an advanced programming feature, such as a protected preset, or a fade rate. If an advanced programming mode feature is modified at the main dimmer 502, the main dimmer 502 transmits to the remote dimmers 504 a digital message having the message description containing the APM command and the message data containing the APM feature to change and the value to change the APM feature to. For example, the digital message may simply be transmitted four times during the Release routine 2000. An advanced programming mode is described in greater detail in commonly-assigned U.S. Pat. No. 7,190,125, issued Mar. 13, 2007, entitled PROGRAMMABLE WALLBOX DIMMER, the entire disclosure of which is hereby incorporated by reference.

Figure 21:
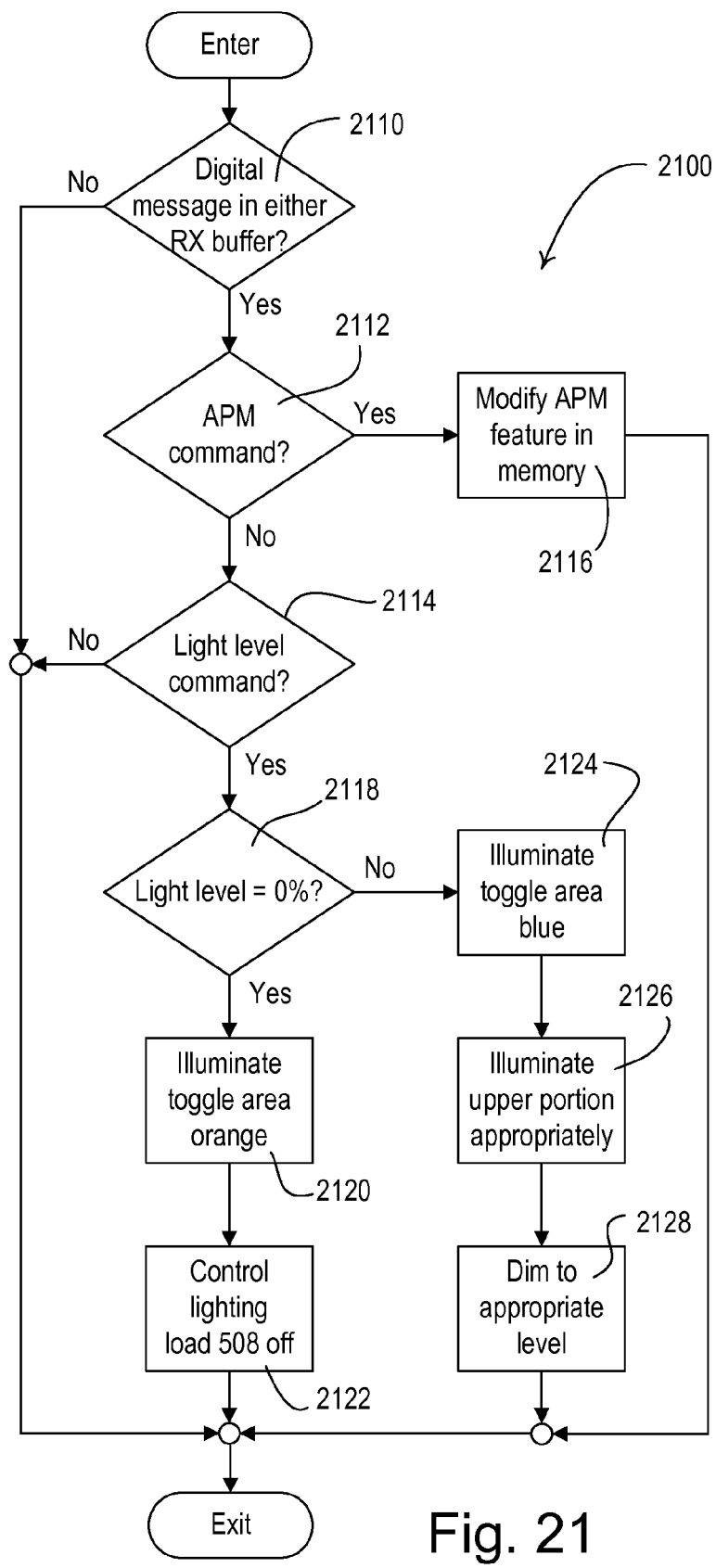
FIG. 21 is a simplified flowchart of a RX buffer procedure executed by the controller of the main dimmer of FIG. 7.

FIG. 21 is a simplified flowchart of a RX buffer procedure 2100 executed periodically by the controller 714 of the main dimmer 502, e.g., once every half-cycle. If there is a digital message in either of the line-side and load-side RX buffers at step 2110, the controller 714 determines whether the message description of the digital message contains an APM command at step 2112 or a light level command at step 2114. If the message description is an APM command at step 2112, the APM feature is modified in the memory 718 at step 2116 and the procedure 2100 exits. If the message description is a light level command at step 2116 and the message data of the digital message is zero percent (i.e., off) at step 2118, the controller 714 illuminates the toggle area (i.e., the lower portion 612B of the actuation member 612) at step 2120, and controls the lighting load 508 to off at step 2122. On the other hand, if the message data for the light level command is an intensity greater than zero percent at step 2118, the controller 714 illuminates the toggle area blue at step 2124, and illuminates the upper portion 612A of the actuation member 612 appropriately (i.e., as a bar graph representative of the present intensity of the lighting load 508) at step 2126. Then, the controller 714 controls the intensity of the lighting load 508 to the appropriate level as determined from the message data of the digital message at step 2128 and the procedure 2100 exits.

Figure 22:
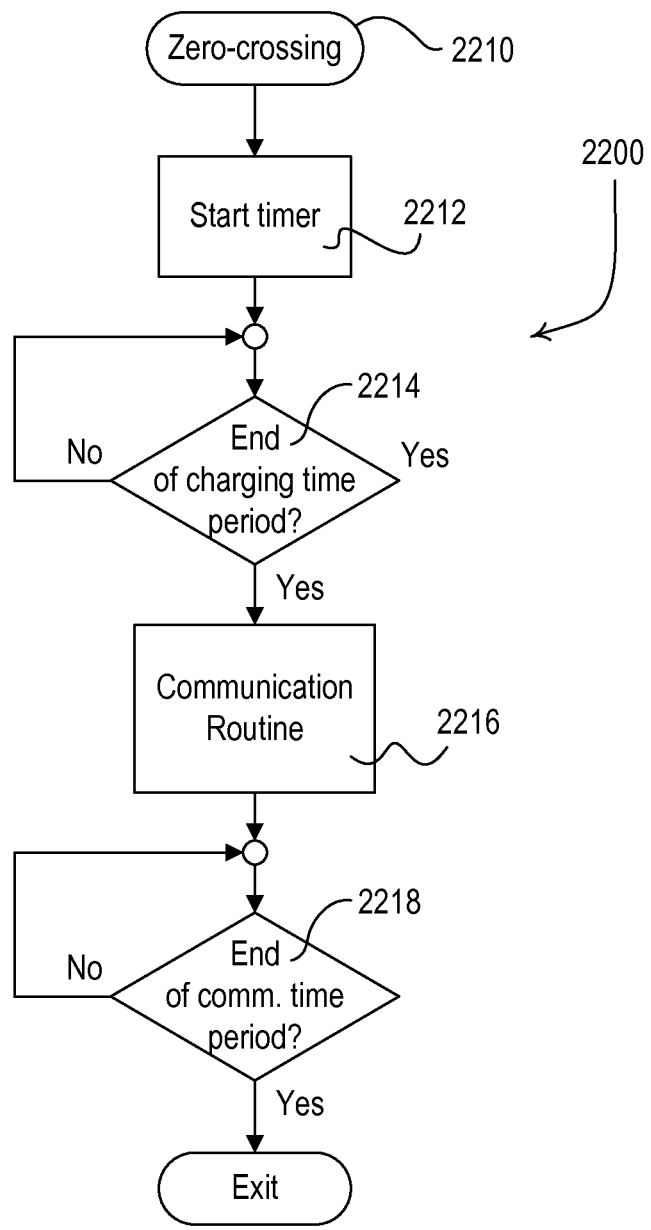
FIG. 22 is a simplified flowchart of a multi-location control procedure executed by controllers of the remote dimmers of FIG. 11.

FIG. 22 is a simplified flowchart of a multi-location control procedure 2200 executed by the controller 1114 of the remote dimmers 504. The procedure 2200 begins at step 2210 when the zero-crossing detector 1116 signals a zero-crossing to the controller, i.e., at the beginning of the charging time $T_{CHRG}$ as shown in FIG. 12. First, the controller 1114 begins a timer at step 2212. At the end of the charging time $T_{CHRG}$ at step 2214, the controller 1114 executes a communication routine 2216, which is similar to the load-side communication routine 1400 of FIG. 14B and the line-side communication routine 1400' of FIG. 14B. However, there is no need for different communication routines and different transmitting and receiving buffers for each half-cycles since the remote dimmer 504 only communicate in one of the half-cycles depending upon whether the remote dimmer is coupled to the line-side or the load-side of the system 500. At the end of the communication time period $T_{COMM}$ at step 2218, the multi-location control procedure 2200 exits.

Since the digital messages transmitted between the main dimmers 502 and the remote dimmers 504 may include APM commands, the APM features of the load control system 500 may be modified using the user interface of the main dimmer or any of the remote dimmers. The main dimmer 502 and the remote dimmers 504 may be used to adjust local advanced programming features (i.e., of the main dimmer 502) and global advanced programming features (i.e., affecting the main dimmer 502 and all remote dimmers 504).

Figure 23:
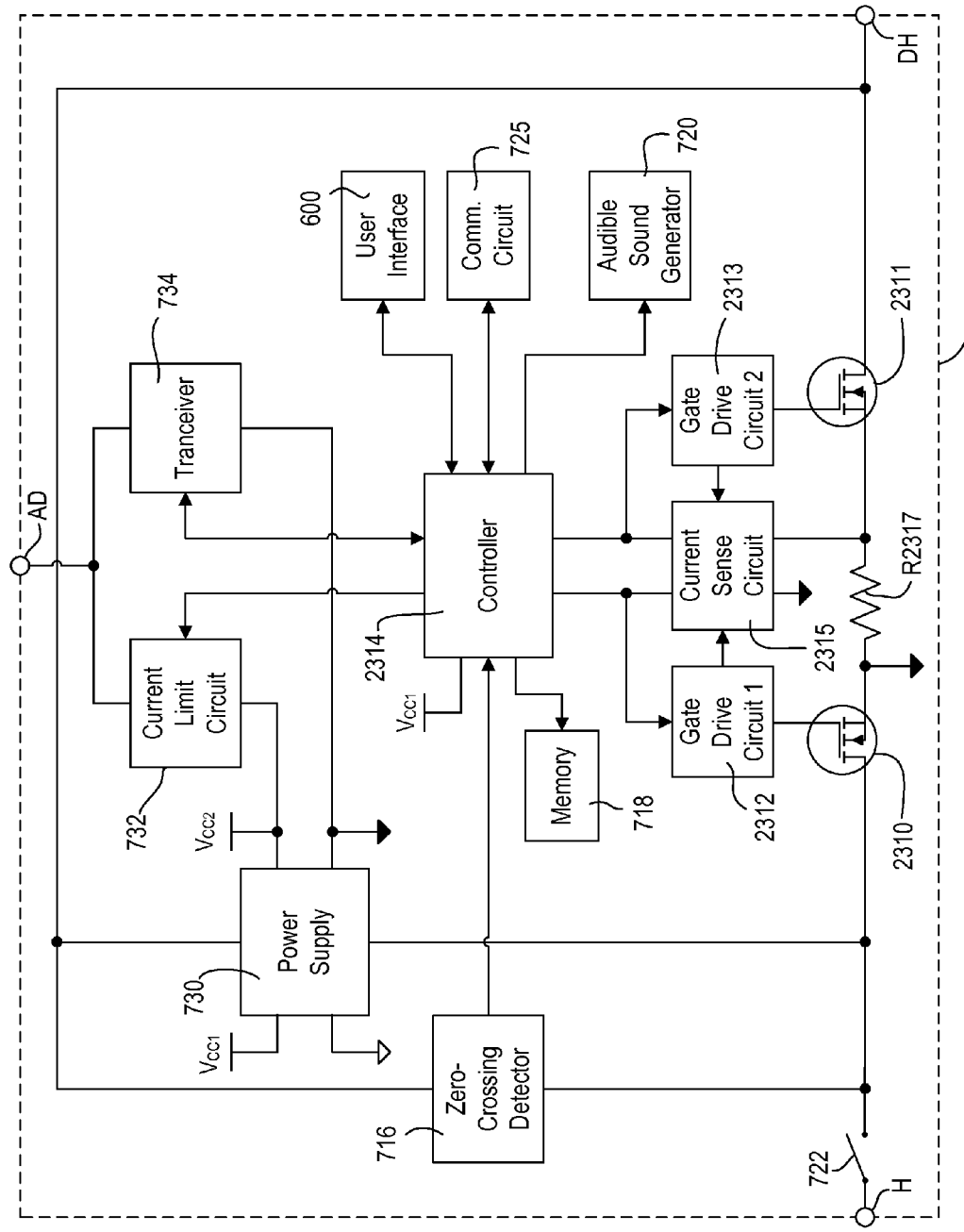
FIG. 23 is a simplified block diagram of a main dimmer according to a second embodiment of the present invention.

FIG. 23 is a simplified block diagram of a main dimmer 2302 according to a second embodiment of the present invention. The bidirectional semiconductor switch of the main dimmer 2302 comprises first and second FETs 2310, 2311 coupled in anti-series connection for control of the amount of power delivered to the lighting load 508. The FETs 2310, 2311 are controlled by a controller 2314 via first and second gate drive circuits 2312, 2313, respectively. Specifically, the controller 2314 is operable to control the FETs 2310, 2311 using the reverse phase control dimming technique, such that the FETs are rendered conductive at the beginning of each half-cycle and then rendered non-conductive a specific time each half-cycle to control the amount of power delivered to the lighting load 508. The FETs 2310, 2311 may be, for example, part number FDPF2710T, manufactured by Fairchild Semiconductors. A current sense resistor R2317 is coupled between the FETs 2310, 2311 and generates a sense voltage having a magnitude representative of the magnitude of the current flowing through the FETs. The current sense resistor R2317 may have, for example, a resistance of 15 mΩ. The junction of the first FET 2310 and the current sense resistor R2317 is coupled to the non-isolated circuit common.

In addition to controlling the amount of power delivered to the lighting load 508, the FETs 2310, 2311 are also controlled to allow for the charging of the power supplies 1130 of the remote dimmers 504 and for the communication of digital messages between the main dimmer 2302 and the remote dimmers 504. Specifically, the controller 2314 renders both FETs 2310, 2311 conductive at the beginning of each half-cycle. During the positive half-cycles, the controller 2314 renders the first FET 2310 non-conductive at the desired time to control the amount of power delivered to the lighting load 508, while appropriately controlling the second FET 2311 to couple the current limit circuit 732 and the transceiver 734 in parallel with the load-side remote dimmers 504 (to allow for the charging of the power supplies 1130 and communication with the load-side remote dimmers). Similarly, during the negative half-cycles, the controller 2314 renders the both FETs 2310, 2311 conductive at the beginning of the half-cycles, and then renders the second FET 2311 non-conductive to adjust the amount of power delivered to the lighting load 508, while controlling the first FET 2310 to allow for the charging of the power supplies 1130 and communication with the line-side remote dimmers 504.

The sense voltage generated across the current sense resistor R2317 is provided to a current sense circuit 2315, which overrides the control of the FETs 2310, 2311 to turn off the FETs in the event of an overcurrent condition. Specifically, if an overcurrent condition is detected, the current sense circuit 2315 renders the first FET 2310 non-conductive during the positive half-cycles and the second FET 2311 non-conductive during the negative half-cycles. The FETs 2310, 2311 are maintained non-conductive for the remainder of the half-cycle, and the controller 2310 resets the current sense circuit 2315 before the beginning of the next half-cycle.

During an overcurrent condition, the controller 2314 is still operable to control the first and second FETs to selectively couple the current limit circuit 732 and the transceiver 734 in parallel with the line-side and load-side remote dimmers 504. When the current sense circuit 2315 renders the first FET 2310 non-conductive during the positive half-cycles, the controller 2314 controls the second FET 2311 to be conductive to allow for communication with the load-side remote dimmers 504. When the current sense circuit 2315 renders the second FET 2311 non-conductive during the negative half-cycles, the controller 2134 controls the first FET 2310 to be conductive to allow for communication with the line-side remote dimmers 504. Therefore, during an overcurrent condition, the current through the FETs 2310, 2311 is limited while maintaining communication between the main dimmer 2302 and the remote dimmers 504.

Figure 24:
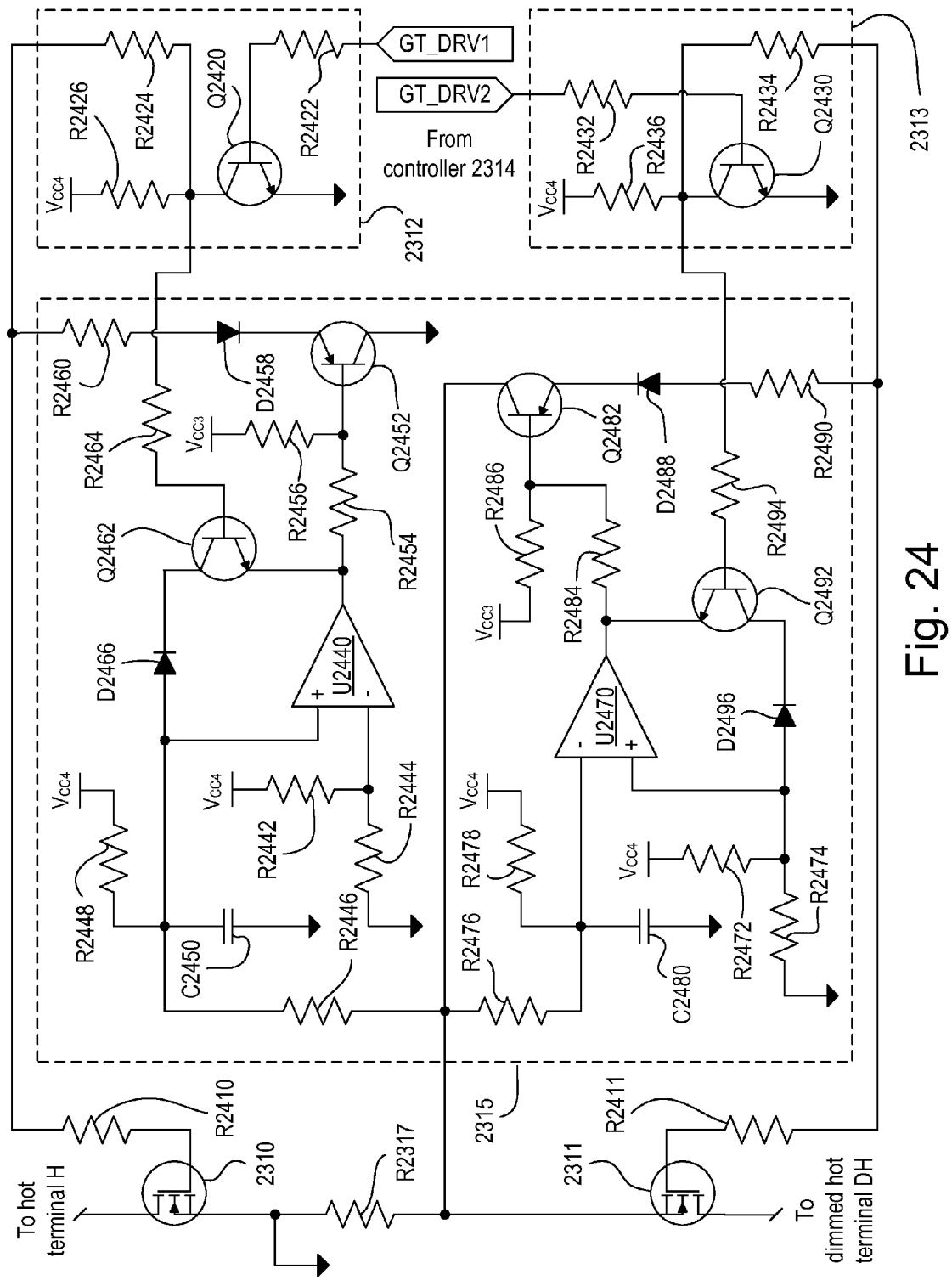
FIG. 24 is a simplified schematic diagram of the main dimmer of FIG. 23 showing first and second gate drive circuits and a current sense circuit in greater detail.

FIG. 24 is a simplified schematic diagram of the main dimmer 2302 showing the first and second gate drive circuits 2312, 2313 and the current sense circuit 2315 in greater detail. The controller 2314 provides gate drive control signals GT_DRV1 and GT_DRV2 to the first and second gate drive circuits 2312, 2313, respectively. The gate drive circuits 2312, 2313 are coupled to the FETs 2310, 2311, respectively, via gate resistors R2410, R2411 (e.g., each having a resistance of 47Ω). The first gate drive control signal GT_DRV1 is coupled to the base of an NPN bipolar junction transistor Q2420 of the first gate drive circuit 2312 via a resistor R2422, which has, for example, a resistance of 33 kΩ. When the first gate drive signal GT_DRV1 is high (i.e., at approximately the fourth non-isolated DC supply voltage $V_{CC4}$), the gate of the first FET 2310 is pulled down towards circuit common through a resistor R2424 (e.g., having a resistance of 1.8 kΩ), thus rendering the first FET non-conductive. When the first gate drive signal GT_DRV1 is low (i.e., at approximately circuit common), the collector of the transistor Q2420 is pulled up towards the fourth non-isolated DC supply voltage $V_{CC4}$ through a resistor R2426 (e.g., having a resistance of 10 kΩ). Accordingly, the first FET 2310 is rendered conductive. The second gate drive circuit 2313 has a similar structure and operates in a similar manner as the first gate drive circuit 2312. The transistors Q2420, Q2430 may be implemented as part of a dual-transistor package, e.g., part number MMDT3904, manufactured by Diodes, Inc.

The current sense circuit 2315 is responsive to the voltage generated across the sense resistor R2317 and thus the current conducted through the FETs 2310, 2311. During the positive half-cycles, the first FET 2310 controls the amount of power delivered to the lighting load 508. At this time, the voltage generated across the sense resistor R2317 has a negative magnitude with respect to the non-isolated circuit common. The current sense circuit 2315 comprises a first comparator U2440 (e.g., part number LM2903, manufactured by On Semiconductor) for rendering the first FET 2310 non-conductive in the event of an overcurrent condition during the positive half-cycles. A first reference voltage is provided to the inverting input of the comparator U2440 and is generated by a resistive divider comprising resistors R2442, R2444. For example, the resistors R2442, R2444 may have resistances of 36.5 kΩ and 8.66 kΩ, respectively, such that the first reference voltage has a nominal magnitude of approximately 1 V. The voltage across the sense resistor R2317 is coupled to the non-inverting input of the comparator U2440 via a resistor R2446 (e.g., having a resistance of 2.15 kΩ) and the non-inverting input is pulled up towards the fourth non-isolated DC supply voltage $V_{CC4}$ via a resistor R2448 (e.g., having a resistance of 6.8 kΩ).

When an overcurrent condition is not presently occurring, the voltage generated across the sense resistor R2317 is such that the magnitude of the voltage at the non-inverting input of the comparator U2440 is greater than the magnitude of the first reference voltage at the inverting input. Therefore, the output of the comparator U2440 is driven high. During an overcurrent condition, the magnitude of the voltage generated across the sense resistor R2317 increases, such that the magnitude of the voltage at the non-inverting input of the comparator U2440 decreases below the magnitude of the first reference voltage, at which time, the comparator drives the output low towards circuit common. A capacitor C2450 is coupled to the non-inverting input of the comparator U2440 to provide some delay in the operation of the current sense circuit 2315 and has, for example, a capacitance of 150 pF.

The output of the comparator U2440 is coupled to the base of a PNP bipolar junction transistor Q2452 through a resistor R2454 (e.g., having a resistance of 2.2 kΩ). The base of the transistor Q2452 is pulled up towards the third non-isolated DC supply voltage $V_{CC3}$ through a resistor R2456 (e.g. having a resistance of 220 kΩ), such that when the output of the comparator U2440 is high, the transistor Q2452 is rendered non-conductive. However, during an overcurrent condition when the output of the comparator U2440 is driven low, the transistor Q2452 is rendered conductive. Accordingly, the voltage at the gate of the first FET 2310 is pulled down towards circuit common through a diode D2458 and a resistor R2460 (e.g., having a resistance of 220Ω), such that the first FET 2310 is rendered non-conductive.

After being rendered conductive, the transistor Q2452 is latched on, such that the first FET 2310 remains non-conductive until the first gate drive circuit 2312 attempts to control the first FET 2310 to be non-conductive. The first gate drive circuit 2312 is coupled to the base of an NPN bipolar junction transistor Q2462 through a resistor R2464 (e.g., having a resistance of 1 kΩ). When the first gate drive circuit 2312 is controlling the first FET 2310 to be conductive and the output of the comparator U2440 is driven low during an overcurrent condition, the transistor Q2462 is rendered conductive. The voltage at the non-inverting input of the comparator U2440 is pulled down towards circuit common through the transistor Q2462 and a diode D2466, such that the output of the comparator U2440 remains low and the transistor Q2452 remains conductive. When the controller 2314 controls the first gate drive control signal GT_DRV1 high to turn off the first FET 2310, the base of the transistor Q2462 is pulled toward circuit common and is rendered non-conductive, thus resetting the current sense circuit 2315. The transistors Q2452, Q2462 may be implemented as part of a dual-transistor package, e.g., part number MMDT3946, manufactured by Diodes, Inc.

During the negative half-cycles, the second FET 2311 is operable to control the amount of power delivered to the lighting load 508 and the voltage generated across the sense resistor R2317 has a negative magnitude with respect to the non-isolated circuit common. The current sense circuit 2315 comprises a second comparator U2470 (e.g., part number LM2903, manufactured by On Semiconductor) for rendering the second FET 2311 non-conductive in the event of an overcurrent condition during the negative half-cycles. A second reference voltage is generated by a resistive divider having two resistors R2472, R2474 and is provided to the non-inverting input of the comparator U2470. The resistors R2472, R2474 have resistances of, for example, 22 kΩ and 9.09 kΩ, respectively, such that the second reference voltage has a nominal magnitude of approximately 1.5 V. The voltage across the sense resistor R2317 is coupled to the inverting input of the comparator U2470 via a resistor R2476 (e.g., having a resistance of 3.01 kΩ). The inverting input of the comparator U2470 is pulled up towards the fourth non-isolated DC supply voltage $V_{CC4}$ via a resistor R2478 (e.g., having a resistance of 9.31 kΩ).

During normal operation when an overcurrent condition is not occurring, the voltage generated across the sense resistor R2317 is such that the magnitude of the voltage at the inverting input of the comparator U2470 is less than the magnitude of the second reference voltage at the non-inverting input and the output of the comparator U2470 is driven high. The magnitude of the voltage generated across the sense resistor R2317 increases during an overcurrent condition, causing the magnitude of the voltage at the inverting input of the comparator U2470 to increase above the magnitude of the second reference voltage. Thus, the comparator U2470 drives the output low towards circuit common. A capacitor C2480 is coupled to the non-inverting input of the comparator U2470 to provide some delay in the operation of the current sense circuit 2315 and has, for example, a capacitance of 150 pF.

The output of the comparator U2470 is coupled to the base of a PNP bipolar junction transistor Q2482 through a resistor R2484 (e.g., having a resistance of 2.2 kΩ). When the output of the comparator U2470 is high, the base of the transistor Q2482 is pulled up towards the third non-isolated DC supply voltage $V_{CC3}$ through a resistor R2486 (e.g. having a resistance of 220 kΩ), thus rendering the transistor Q2482 non-conductive. During an overcurrent condition, the output of the comparator U2470 is driven low and the transistor Q2482 is rendered conductive. At this time, the voltage at the gate of the second FET 2311 is "shorted out" through a diode D2488 and a resistor R2490 (e.g., having a resistance of 220Ω), such that the second FET 2311 is rendered non-conductive.

The second gate drive circuit 2313 is coupled to the base of an NPN bipolar junction transistor Q2492 through a resistor R2494 (e.g., having a resistance of 1 kΩ). When the second gate drive circuit 2313 is controlling the first FET 2311 to be conductive and the output of the comparator U2470 is driven low during an overcurrent condition, the transistor Q2492 is rendered conductive. The voltage at the non-inverting input of the comparator U2470 is pulled down towards circuit common through the transistor Q2482 and a diode D2488. Accordingly, the output of the comparator U2470 remains low, and the transistor Q2482 is latched on, such that the second FET 2311 remains non-conductive until the second gate drive circuit 2313 renders the second FET 2311 non-conductive. The current sense circuit 2315 is reset when the controller 2314 controls the second gate drive control signal GT_DRV2 high to turn off the second FET 2311, and the base of the transistor Q2492 is pulled toward circuit common, rendering the transistor Q2492 non-conductive. The transistors Q2482, Q2492 may be implemented as part of a dual-transistor package, e.g., part number MMDT3946, manufactured by Diodes, Inc.

Figure 25:
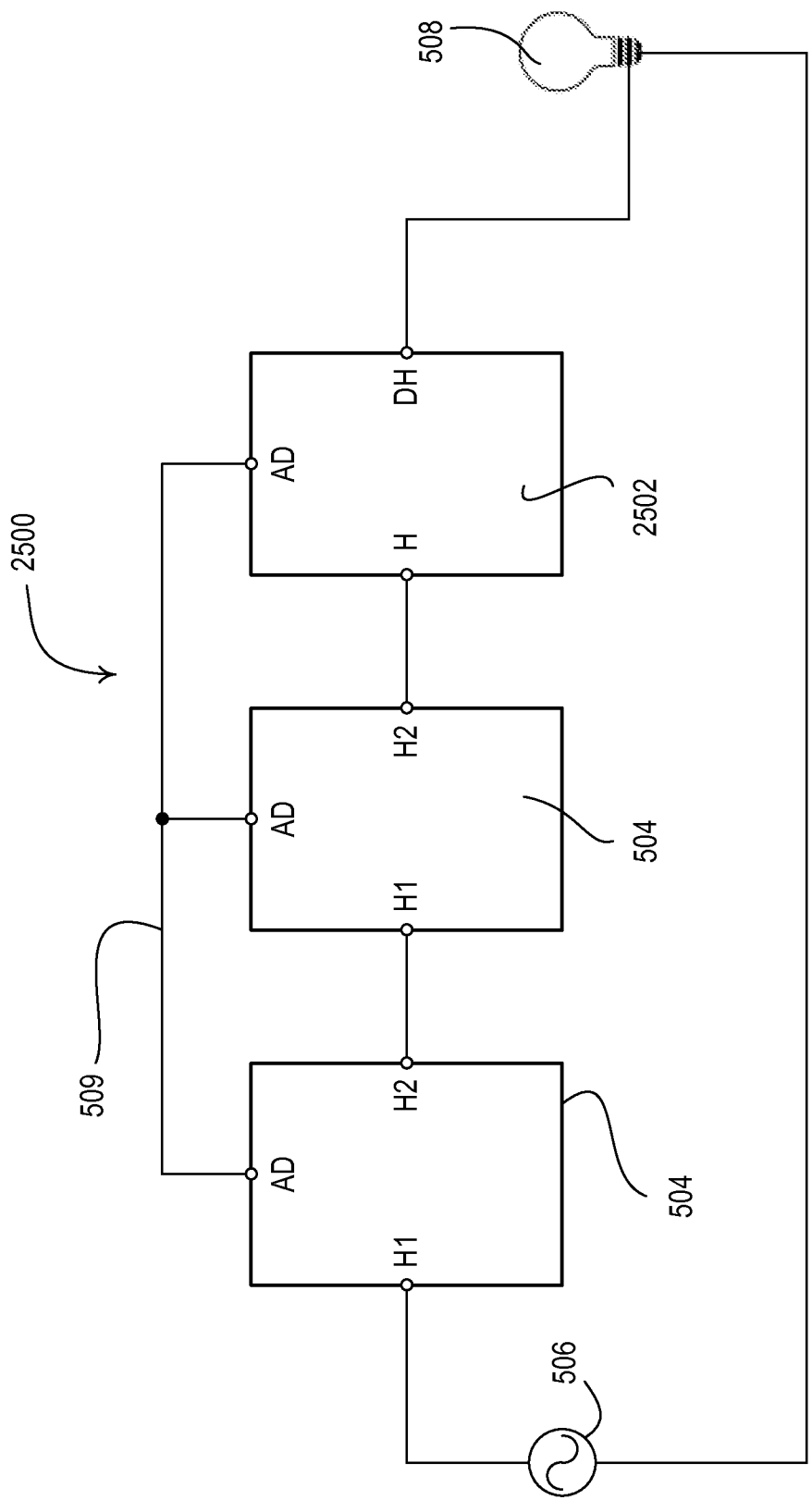
FIG. 25 is a simplified block diagram of a multiple location dimming system having a main dimmer and remote dimmers according to a third embodiment of the present invention.

FIG. 25 is a simplified block diagram of a multiple location dimming system 2500 having a main dimmer 2502 and two remote dimmers 504 according to a third embodiment of the present invention. According to the second embodiment, the main dimmer 2502 must be located on either the load-side of the system 2500 (i.e., directly to the lighting load 508 as shown in FIG. 25) or the line-side of the system (i.e., directly to the AC power source 506).

Figure 26:
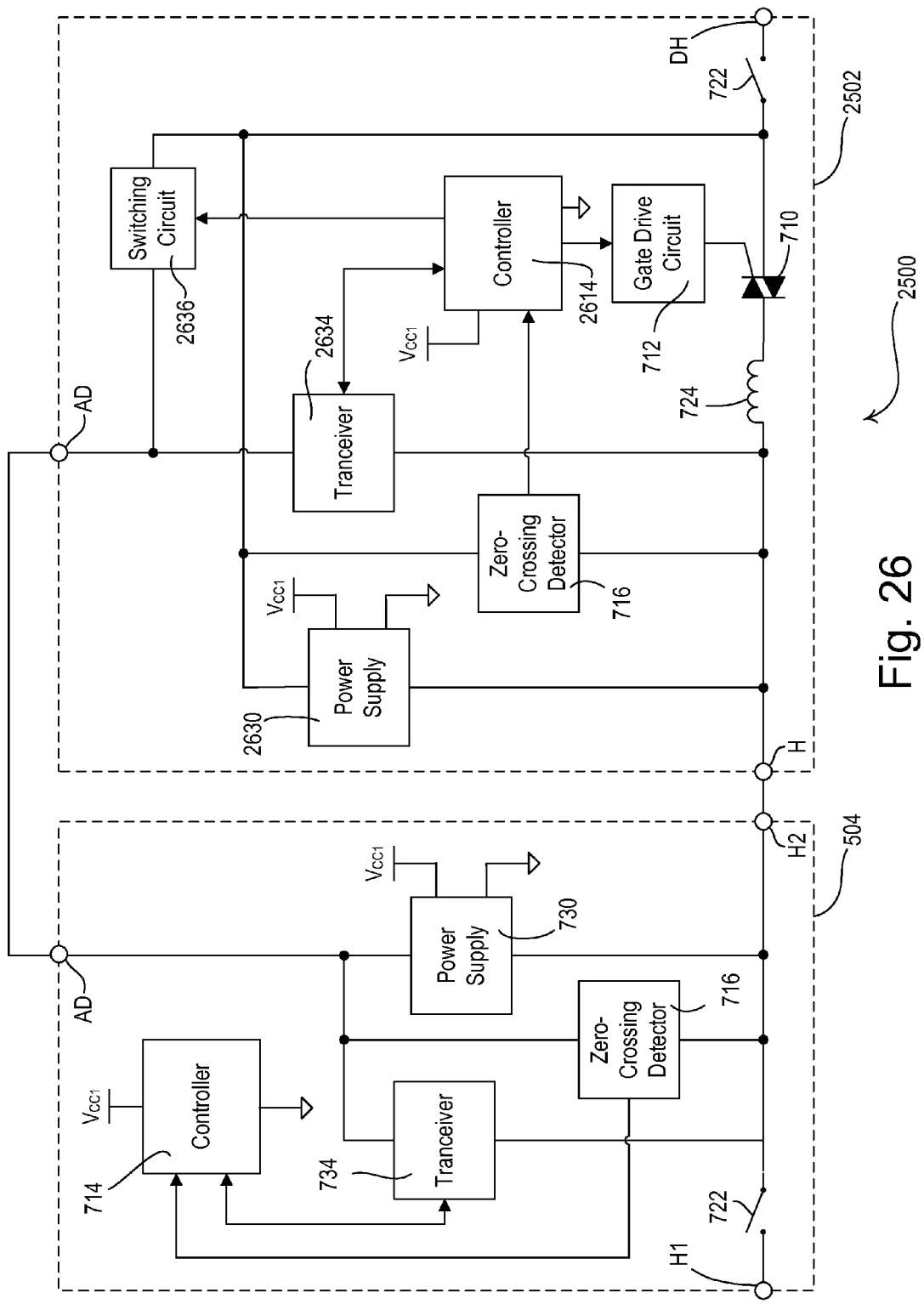
FIG. 26 is a simplified block diagram of the main dimmer and the remote dimmer of FIG. 25 according to the third embodiment of the present invention.

FIG. 26 is a simplified block diagram of the main dimmer 2500 and the remote dimmer 504 according to the third embodiment of the present invention. The main dimmer 2500 comprises a single switching circuit 2636 coupled between the dimmed hot terminal DH and the accessory dimmer terminal AD, such that the switching circuit 2636 provides a charging path for the power supply 730 of the remote dimmer 504. A controller 2614 controls the switching circuit 2636 to be conductive to allow the power supply 730 of the remote dimmer 504 to charge during a charging time each half-cycle of the AC power source 506. After the charging time, the switching circuit 2636 is rendered non-conductive. During the charging time, the power supply 730 is coupled in series between the AC power source 506 and the lighting load 508. As shown in FIG. 26, the switching circuit 2636 does not limit the current through the power supply 730 during the charging time. However, the main dimmer 2502 may further comprises a current limiting circuit (not shown) coupled in series with the switching circuit 2636 for limiting the current through the power supply 730.

The controller 2614 is only operable to render the semiconductor switch 710 conductive after the end of the charging time to control the amount of power delivered to the lighting load 508. A transceiver 2634 is coupled from the hot terminal H to the accessory dimmer terminal AD, such that the transceiver 2634 of the main dimmer 2502 is coupled in parallel with the transceiver 734 of the remote dimmer 504. The controller 2614 is operable to transmit and receive digital messages via the transceiver 2634 during a communication time immediately following the charging time. The main dimmer 2502 further comprising a power supply 2630, which generates an isolated DC supply voltage $V_{CC1}$ for powering the controller 2614 and other low-voltage circuitry of the main dimmer.

While the main dimmer 2502 is shown on the load-side of the system 2500 in FIGS. 25 and 26, the main dimmer 2502 could alternatively be coupled to the line-side of the system 2500, with the dimmed-hot terminal DH coupled to the AC power source 506 and the hot terminal H coupled to the remote dimmers 504. Since the main dimmer 2502 is coupled to either the load-side or the line-side of the system 2500, the main dimmer 2502 only renders the switching circuit 2636 conductive and communicates with the remote dimmers 504 during every other half-cycle of the AC power source. For example, when the main dimmer 2502 is coupled to the load-side of the system 2500, the main dimmer allows the power supplies 730 of the remote dimmers 504 to charge and communicates with the remote dimmers 504 during the positive half-cycles. On the other hand, the main dimmer 2502 allows the power supplies 730 of the remote dimmers 504 to charge and communicates with the remote dimmers 504 during the negative half-cycles when the main dimmer is coupled to the line-side of the system 2500. The main dimmer 2502 does not need to retransmit digital messages in subsequent half-cycles.

Although the present invention has been described in relation to particular embodiments thereof, many other variations and modifications and other uses will become apparent to those skilled in the art. Therefore, the present invention should not be limited by the specific disclosure herein.

The values provided herein for the values and part numbers of the components described herein (e.g., as shown FIGS. 8, 9, 10, 23, and 24) are provided as examples in regards to the embodiments of the present invention and should not limit the scope of the present invention. For example, it would be well within the capabilities of one having ordinary skill in the art to modify the values of the components of FIGS. 8, 9, 10, 23, and 24 and still obtain the load control system of the present invention.

What is claimed is:

1. A load control system for controlling the power delivered to an electrical load from an AC power source, the system comprising:

a main load control device for controlling the electrical load, the main load control device operable to conduct a load current from the AC power source to the electrical load, the main load control device comprising a receiver for receiving digital messages, such that the main load control device is operable to control the electrical load in response to the received digital messages; and a remote load control device adapted to be coupled in series electrical connection with the main load control device between the AC power source and the electrical load, such that the remote load control device is operable to conduct the load current from the AC power source to the electrical load, the remote load control device comprising a power supply operable to charge from the AC power source through the main load control device during a first time period of a half-cycle of the AC power source, the remote load control device further comprising a transmitter for transmitting digital messages;

wherein the transmitter of the remote load control device and the receiver of the main load control device are coupled together such that the transmitter of the remote load control device is operable to transmit at least a portion of a digital message to the receiver of the main load control device during a second time period of the half-cycle.

2. The load control system of claim 1, wherein the transmitter of the remote load control device and the receiver of the main load control device are coupled together so as to form a communication path during the second time period of the half-cycle.

3. The load control system of claim 2, wherein the main load control device comprises a switching circuit operable to be rendered conductive to form the communication path between the receiver of the main load control device and the transmitter of the remote load control device during the second time period of half-cycle.

4. The load control system of claim 2, wherein the communication path formed by the main load control device and the remote control device does not pass through the electrical load.

5. The load control system of claim 2, wherein the communication path formed by the main load control device and the remote control device does not pass through the AC power source.

6. The load control system of claim 1, wherein the transmitter of the remote load control device is operable to transmit a single digital message to the receiver of the main load control device over multiple half-cycles, such that the transmitter transmits a predetermined number of bits of the single digital message during each of the multiple half-cycles.

7. The load control system of claim 6, wherein the remote load control device comprises an actuator for receiving a user input, the transmitter operable to transmit the single digital message over the multiple half-cycles in response to an actuation of the actuator.

8. The load control system of claim 1, wherein the remote load control device is adapted to be coupled to the main load control device through an accessory wiring, such that the transmitter of the remote load control device is operable to transmit digital messages to the receiver of the main load device via the accessory wiring during the second time period.

9. The load control system of claim 8, wherein the main load control device generates a supply voltage and provides the supply voltage on the accessory wiring to allow the remote load control device to charge the power supply.

10. The load control system of claim 1, wherein the main load control device and the remote load control device both comprise transceivers, such that the main load control device and the remote load control device are operable to communicate with each other.

11. The load control system of claim 1, wherein the first time period occurs at approximately the same time each half-cycle, and the second time period occurs at approximately the same time each half-cycle.

12. A load control device adapted for use in a load control system for controlling the power delivered to an electrical load from an AC power source, the load control system comprising a remote control device having a power supply and a transmitter, the load control device comprising:
- a load control circuit adapted to be coupled in series electrical connection between the AC power source and the electrical load to control the power delivered to the electrical load;
- a controller operatively coupled to the load control circuit for controlling the power delivered to the electrical load;
- a switching circuit operable to be rendered conductive by the controller to allow the power supply of the remote control device to draw current in order to charge during a first time period of a half-cycle of the AC power source; and
- a receiver coupled to the controller for receiving digital messages, the receiver adapted to be coupled to the transmitter of the remote control device such that the controller is operable to receive at least a portion of a digital message from the transmitter of the remote load control device during a second time period of the half-cycle.

13. The load control device of claim 12, wherein the receiver is adapted to be coupled to the transmitter of the remote control device so as to form a communication path during a second time period of the half-cycle.

14. The load control device of claim 13, wherein the controller is operable to render the switching circuit conductive during the second time period to form the communication path.

15. The load control device of claim 12, wherein the load control circuit comprises a bidirectional semiconductor switch having a control input, the controller coupled to the control input of the bidirectional semiconductor switch for rendering the bidirectional semiconductor switch conductive.

16. The load control device of claim 12, further comprising:
- an accessory terminal adapted to be coupled to the remote control device, the switching circuit coupled to the accessory terminal for allowing the power supply of the remote control device to draw current through the accessory terminal, the receiver coupled to the accessory terminal for receiving digital messages from the transmitter of the remote control device; and
- a power supply for generating a supply voltage, the power supply having an output operatively coupled to the accessory terminal, such that the supply voltage is provided at the accessory terminal during the first time period.

17. The load control device of claim 12, wherein the receiver is operable to receive a single digital message from the transmitter of the remote control device over multiple half-cycles, such that the receiver receives predetermined number of bits of the digital message during each of the multiple half-cycles.

18. The load control system of claim 12, wherein at least one of the digital messages comprises a command to control the amount of power delivered to the load.

19. The load control system of claim 12, wherein the first time period occurs at approximately the same time each half-cycle, and the second time period occurs at approximately the same time each half-cycle.

20. A method of controlling an amount of power delivered to an electrical load from an AC power source in a load control system including a main load control device and a remote load control device, the method comprising:
- the main load control device rendering a switching circuit conductive to conduct a charging current of a power supply of the remote load control device during a first time period of a half-cycle of the AC power source, the first time period occurring at approximately the same time each half-cycle;
- the main load control device receiving digital messages from the remote load control device during a second time period of the half-cycle, the second time period occurring at approximately the same time each half-cycle; and
- the main load control device adjusting the amount of power being delivered to the load in response to the digital messages transmitted by the remote load control device.

* * * * *